(12) United States Patent
Sasaki et al.

(10) Patent No.: US 8,848,494 B2
(45) Date of Patent: Sep. 30, 2014

(54) PLASMON GENERATOR INCLUDING TWO PORTIONS MADE OF DIFFERENT METALS

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpitas, CA (US); Ryuji Fujii, Hong Kong (CN)

(73) Assignees: Headway Technologies Inc., Milpitas, CA (US); Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/783,933

(22) Filed: Mar. 4, 2013

(65) Prior Publication Data

US 2014/0247706 A1  Sep. 4, 2014

(51) Int. Cl.
*G11B 11/00* (2006.01)
*G11B 13/08* (2006.01)

(52) U.S. Cl.
CPC ..................................... *G11B 13/08* (2013.01)
USPC ...................................................... 369/13.33

(58) Field of Classification Search
USPC ........ 369/13.02, 13.13, 13.32, 13.33; 360/59; 29/603.07–603.27
See application file for complete search history.

(56) References Cited

U.S. PATENT DOCUMENTS

| | | | |
|---|---|---|---|
| 7,529,158 B2* | 5/2009 | Matsumoto et al. | 369/13.33 |
| 8,305,849 B2* | 11/2012 | Hara et al. | 369/13.33 |
| 8,514,673 B1* | 8/2013 | Zhao et al. | 369/13.33 |
| 2009/0207703 A1* | 8/2009 | Matsumoto et al. | 369/13.33 |
| 2011/0170381 A1* | 7/2011 | Matsumoto | 369/13.33 |
| 2012/0113771 A1* | 5/2012 | Matsumoto | 369/13.33 |
| 2013/0107681 A1* | 5/2013 | Sasaki et al. | 369/13.33 |

* cited by examiner

*Primary Examiner* — Brenda Bernardi
(74) *Attorney, Agent, or Firm* — Oliff PLC

(57) ABSTRACT

A plasmon generator has a front end face located in a medium facing surface of a magnetic head. The plasmon generator includes a first portion formed of a first metal material and a second portion formed of a second metal material. The first portion has an inclined surface facing toward the front end face. The second portion is located between the inclined surface and the front end face, and includes a first end face located in the front end face and a second end face in contact with the inclined surface. The second metal material is higher in Vickers hardness than the first metal material. The first portion has a plasmon exciting part. The front end face generates near-field light.

13 Claims, 20 Drawing Sheets

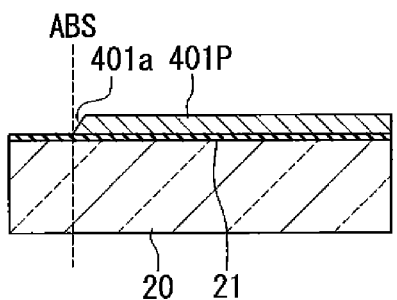
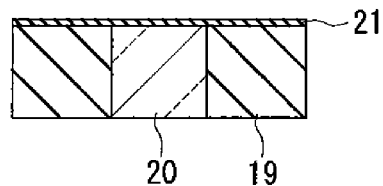
FIG. 6A  FIG. 6B
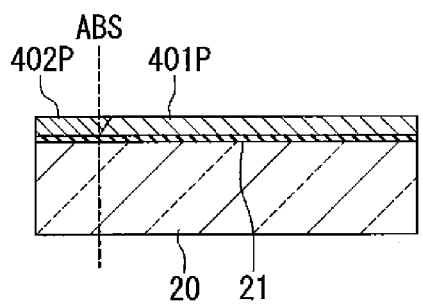
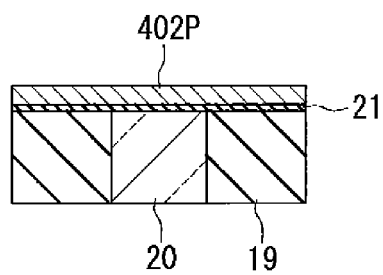
FIG. 7A  FIG. 7B
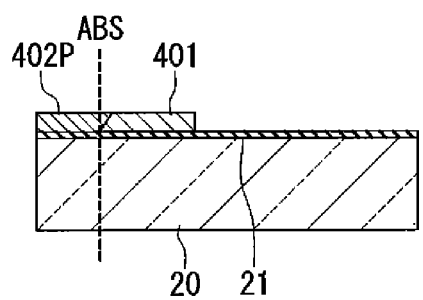
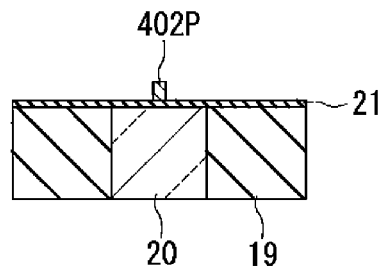
FIG. 8A  FIG. 8B

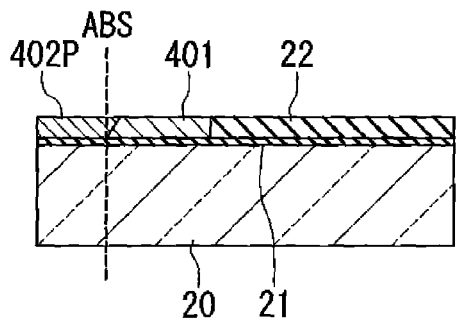 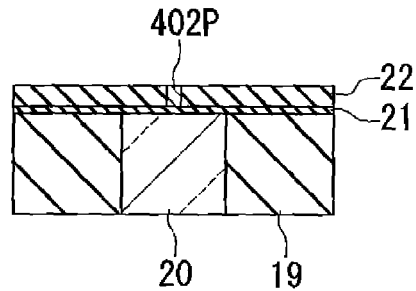
FIG. 9A  FIG. 9B
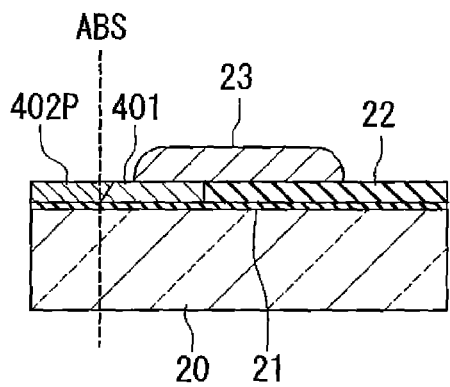 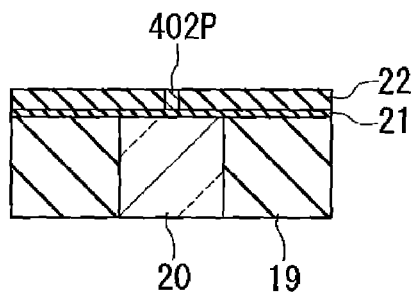
FIG. 10A  FIG. 10B
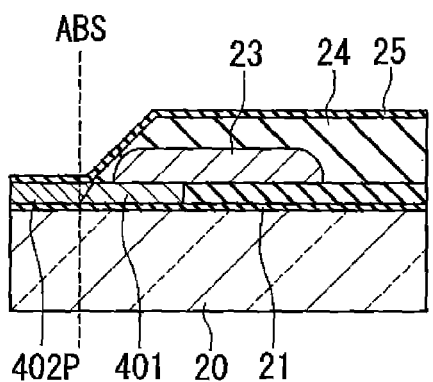 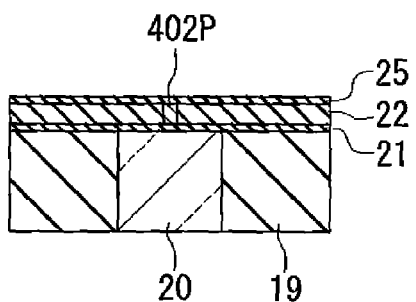
FIG. 11A  FIG. 11B

PLASMON GENERATOR INCLUDING TWO PORTIONS MADE OF DIFFERENT METALS

BACKGROUND OF THE INVENTION

1. Field of the Invention

The present invention relates to a plasmon generator for use in thermally-assisted magnetic recording where a recording medium is irradiated with near-field light to lower the coercivity of the recording medium for data writing, and to a thermally-assisted magnetic recording head including the plasmon generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, a thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near a medium facing surface of the slider.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagating through the waveguide is used to excite surface plasmons on the metallic structure, so that near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, if a plasmon generator is formed entirely of Au or Ag, there are problems as described below.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. If the plasmon generator is formed entirely of Au or Ag, which are relatively soft, the polishing and etching mentioned above may cause the front end face of the plasmon generator to be significantly recessed relative to the other parts of the medium facing surface. In such a case, the front end face of the plasmon generator becomes distant from the recording medium, and the heating performance of the plasmon generator is thus degraded.

Part of the energy of light guided to the plasmon generator through the waveguide is transformed into heat in the plasmon generator. Part of the energy of near-field light generated by the plasmon generator is also transformed into heat in the plasmon generator. The plasmon generator thus increases in temperature during the operation of the thermally-assisted magnetic recording head. A plasmon generator that is formed entirely of Au or Ag will expand and significantly protrude toward the recording medium when the temperature of the plasmon generator increases. As a result, a protective film covering the medium facing surface may come into contact with the recording medium. This may cause damage to the recording medium or cause the protective film to be broken. When the protective film is broken, the plasmon generator may be damaged by contact with the recording medium or may be corroded by contact with high temperature air.

Further, a plasmon generator that is formed entirely of Au or Ag may be deformed due to aggregation when its temperature increases. In addition, such a plasmon generator expands when its temperature increases and then contracts when its temperature decreases. When the plasmon generator undergoes such a process, the front end face of the plasmon generator may be significantly recessed relative to the other parts of the medium facing surface. In such a case, the heating performance of the plasmon generator is degraded as mentioned above.

For the various reasons described above, a plasmon generator formed entirely of Au or Ag has the drawback of being low in reliability.

U.S. Patent Application Publication No. 2011/0170381 A1 discloses a metallic structure composed of a main body and a layer having a greater hardness than the main body (this layer will hereinafter be referred to as the hard layer). In this metallic structure, the main body is not exposed in the medium facing surface, but the hard layer is exposed in the medium facing surface. In this metallic structure, surface plasmons are generated in the main body. The generated surface plasmons propagate to the hard layer, and near-field light is generated from the vertex of the hard layer. This metallic structure has the drawback that there is a great loss of the surface plasmons as they propagate from the main body to the hard layer, and it is thus difficult to allow the surface plasmons to efficiently propagate to the vertex.

OBJECT AND SUMMARY OF THE INVENTION

It is an object of the present invention to provide a plasmon generator of high reliability that allows surface plasmons to propagate to the front end face efficiently, and to provide a thermally-assisted magnetic recording head having such a plasmon generator.

A plasmon generator of the present invention has a front end face. Further, the plasmon generator of the present invention includes a first portion formed of a first metal material and a second portion formed of a second metal material. The first portion has an inclined surface facing toward the front end face. The inclined surface has a first edge farthest from the front end face and a second edge closest to the front end face. The distance from the front end face to an arbitrary point on the inclined surface decreases with decreasing distance from the arbitrary point to the second edge. The second portion is located between the inclined surface and the front end face, and includes a first end face located in the front end face and a second end face in contact with the inclined surface. The second metal material is higher in Vickers hardness than the first metal material. The first portion has a plasmon exciting part configured to excite a surface plasmon thereon through coupling with evanescent light generated from a core through which light propagates. The front end face generates near-field light based on the surface plasmon.

A thermally-assisted magnetic recording head of the present invention includes: a medium facing surface facing a recording medium; a main pole that produces a write magnetic field for writing data on the recording medium; a waveguide; and a plasmon generator. The waveguide includes a core through which light propagates, and a cladding provided around the core. The plasmon generator has a front end face located in the medium facing surface.

In the thermally-assisted magnetic recording head of the present invention, the plasmon generator includes a first portion formed of a first metal material and a second portion formed of a second metal material. The first portion has an inclined surface facing toward the front end face. The inclined surface has a first edge farthest from the front end face and a second edge closest to the front end face. The distance from the front end face to an arbitrary point on the inclined surface decreases with decreasing distance from the arbitrary point to the second edge. The second portion is located between the inclined surface and the front end face, and includes a first end face located in the front end face and a second end face in contact with the inclined surface. The second metal material is higher in Vickers hardness than the first metal material. The first portion has a plasmon exciting part configured to excite a surface plasmon thereon through coupling with evanescent light generated from the core. The front end face generates near-field light based on the surface plasmon.

In the plasmon generator and the thermally-assisted magnetic recording head of the present invention, the first portion may further have a first surface connected to the inclined surface at the first edge and extending in a direction intersecting the front end face, and a second surface opposite to the first surface. The second surface may constitute the plasmon exciting part.

In the plasmon generator and the thermally-assisted magnetic recording head of the present invention, no part of the first portion other than the second edge of the inclined surface may be located in the front end face.

In the plasmon generator and the thermally-assisted magnetic recording head of the present invention, the first portion may further have an end face located in the front end face. The end face of the first portion is smaller in area than the first end face of the second portion.

In the plasmon generator and the thermally-assisted magnetic recording head of the present invention, no part of the first portion may constitute part of the front end face.

In the plasmon generator and the thermally-assisted magnetic recording head of the present invention, the first portion may include a first layer and a second layer stacked. The first layer has an end face located in the front end face. The second layer has the inclined surface. The end face of the first layer is smaller in area than the first end face of the second portion.

In the thermally-assisted magnetic recording head of the present invention, the core may have an evanescent light generating surface that generates evanescent light based on the light propagating through the core, and the cladding may include an interposition part interposed between the evanescent light generating surface and the plasmon exciting part.

According to the present invention, it is possible to provide a plasmon generator of high reliability that allows surface plasmons to propagate to the front end face efficiently, and to provide a thermally-assisted magnetic recording head having such a plasmon generator.

Other and further objects, features and advantages of the present invention will appear more fully from the following description.

BRIEF DESCRIPTION OF THE DRAWINGS

FIG. 6A and FIG. 6B are cross-sectional views showing a step of a method of manufacturing the thermally-assisted magnetic recording head according to the first embodiment of the invention.

FIG. 7A and FIG. 7B are cross-sectional views showing a step that follows the step shown in FIG. 6A and FIG. 6B.

FIG. 8A and FIG. 8B are cross-sectional views showing a step that follows the step shown in FIG. 7A and FIG. 7B.

FIG. 9A and FIG. 9B are cross-sectional views showing a step that follows the step shown in FIG. 8A and FIG. 8B.

FIG. 10A and FIG. 10B are cross-sectional views showing a step that follows the step shown in FIG. 9A and FIG. 9B.

FIG. 11A and FIG. 11B are cross-sectional views showing a step that follows the step shown in FIG. 10A and FIG. 10B.

DETAILED DESCRIPTION OF THE PREFERRED EMBODIMENTS

First Embodiment

Figure 4:
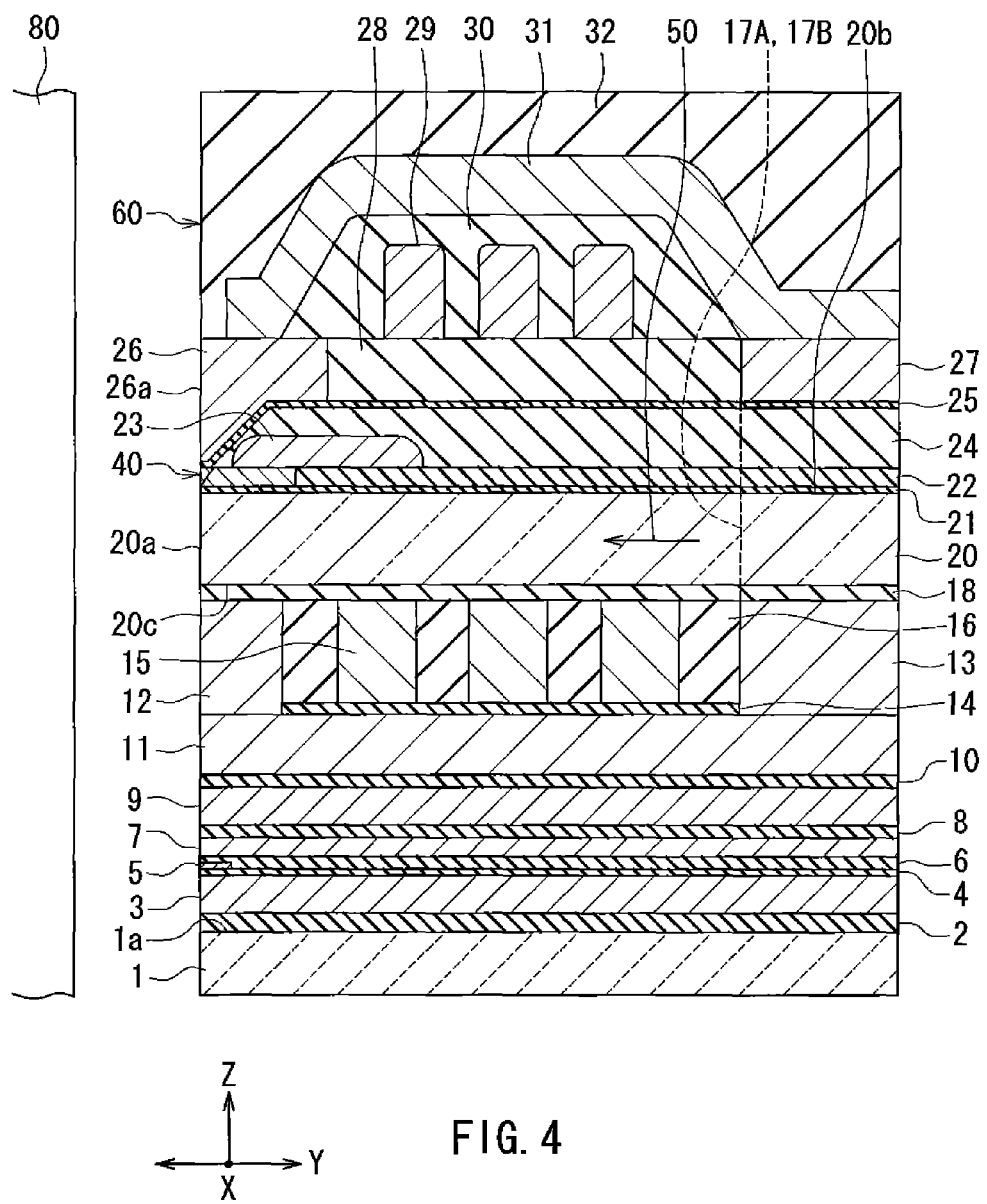
FIG. 4 is a cross-sectional view showing the configuration of the thermally-assisted magnetic recording head according to the first embodiment of the invention.
Figure 5:
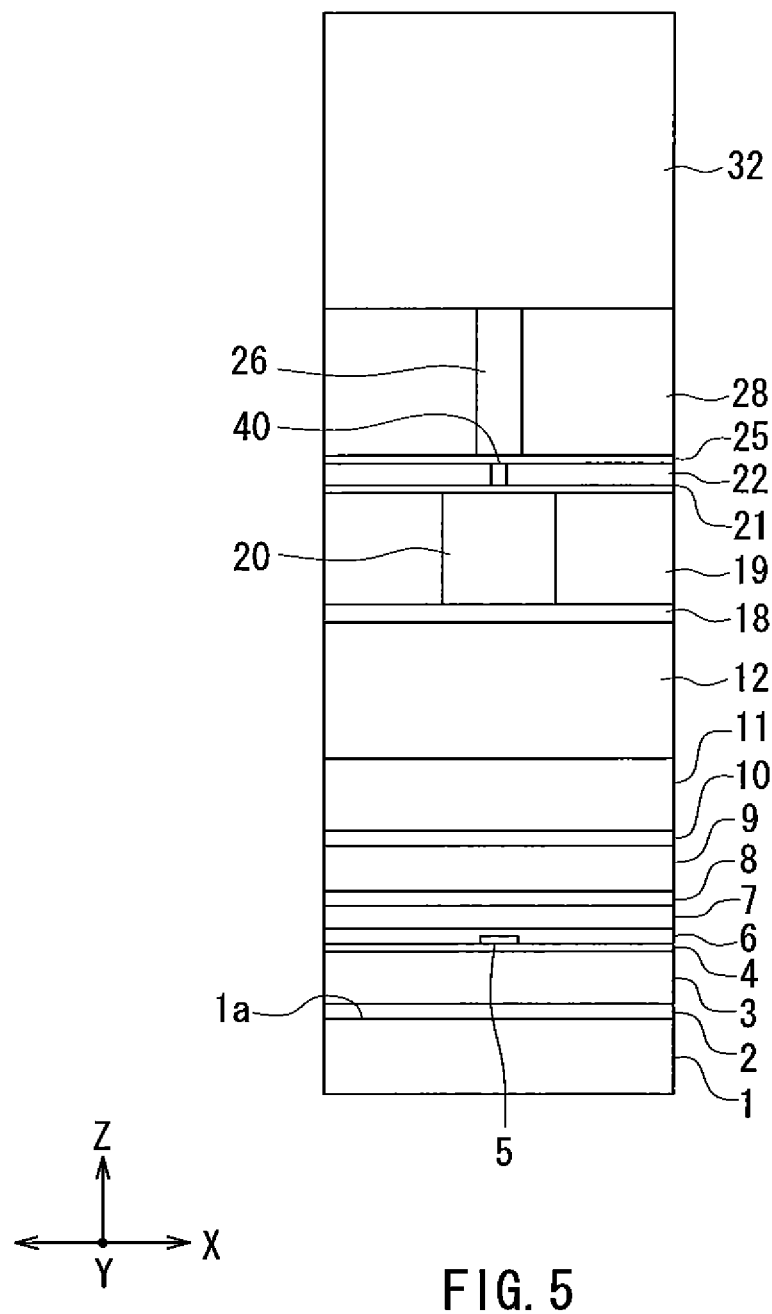
FIG. 5 is a front view showing the medium facing surface of the thermally-assisted magnetic recording head according to the first embodiment of the invention.

Preferred embodiments of the present invention will now be described in detail with reference to the drawings. First, reference is made to FIG. 4 and FIG. 5 to describe the configuration of a thermally-assisted magnetic recording head according to a first embodiment of the invention. The thermally-assisted magnetic recording head according to the present embodiment includes a plasmon generator according to the present embodiment. FIG. 4 is a cross-sectional view showing the configuration of the thermally-assisted magnetic recording head. FIG. 5 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 4, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 4 and FIG. 5, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 formed of a magnetic material and disposed on the insulating layer 8, and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes a shield layer 12 located close to the medium facing surface 60 and lying on a part of the return pole layer 11, a coupling layer 13 located away from the medium facing surface 60 and lying on another part of the return pole layer 11, an insulating layer 14 lying on the remaining part of the return pole layer 11 and on the non-illustrated insulating layer, and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B has a first layer located on the coupling layer 13, and a second and a third layer stacked in this order on the first layer. The first layer of the coupling portion 17A and the first layer of the coupling portion 17B are disposed to be aligned in the track width direction (the X direction). The insulating layer 16 is formed of alumina, for example.

The thermally-assisted magnetic recording head further includes a waveguide. The waveguide includes a core 20 through which light propagates, and a cladding provided around the core 20. The core 20 will be described in detail later.

The cladding includes cladding layers 18, 19, and 21. The cladding layer 18 is disposed over the shield layer 12, the coupling layer 13, the coil 15, and the insulating layer 16. The core 20 is disposed on the cladding layer 18. The cladding layer 19 is disposed on the cladding layer 18 and surrounds the core 20. The cladding layer 21 is disposed over the core 20 and the cladding layer 19.

The core 20 is formed of a dielectric material that transmits laser light to be used for generating near-field light. The laser light emitted from a laser diode (not illustrated) enters the core 20 and propagates through the core 20. The cladding layers 18, 19, and 21 are each formed of a dielectric material that has a refractive index lower than that of the core 20. For example, the core 20 may be formed of tantalum oxide such as $Ta_2O_5$ or silicon oxynitride (SiON), while the cladding layers 18, 19, and 21 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), each being at a distance from the core 20.

The thermally-assisted magnetic recording head further includes a main pole 26 disposed above the core 20 in the vicinity of the medium facing surface 60, and a plasmon generator 40 interposed between the core 20 and the main pole 26. The plasmon generator 40 is configured to excite surface plasmons on the principle to be described later. The plasmon generator 40 will be described in detail later.

The main pole 26 has an end face 26a located in the medium facing surface 60. The main pole 26 may include a narrow portion having the end face 26a and an end portion opposite to the end face 26a, and a wide portion connected to the end portion of the narrow portion. The wide portion is greater than the narrow portion in width in the track width direction (the X direction).

The thermally-assisted magnetic recording head further includes a dielectric layer 22 lying on the cladding layer 21 and surrounding the plasmon generator 40, a heat sink 23 lying astride part of the plasmon generator 40 and part of the dielectric layer 22, a dielectric layer 24 disposed to cover the heat sink 23, and a dielectric layer 25 disposed to cover the plasmon generator 40 and the dielectric layer 24. The maximum thickness of the heat sink 23 is in the range of 200 to 500 nm, for example. The dielectric layer 24 has a top surface, and an end face closest to the medium facing surface 60. The distance from the medium facing surface 60 to an arbitrary point on the aforementioned end face of the dielectric layer 24 decreases with decreasing distance from the arbitrary point to the top surface 1a of the substrate 1. The maximum thickness of the dielectric layer 24 is in the range of 500 to 800 nm, for example.

The main pole 26 is disposed on the dielectric layer 25 so as to lie above part of each of the top surface of the plasmon generator 40, the end face of the dielectric layer 24 and the top surface of the dielectric layer 24. The dielectric layer 25 has a thickness in the range of, for example, 10 to 40 nm, preferably in the range of 15 to 25 nm.

The third layers of the coupling portions 17A and 17B are embedded in the cladding layer 21 and the dielectric layers 22, 24, and 25. The dielectric layers 22, 24, and 25 may be formed of $SiO_2$ or alumina, for example. The heat sink 23 is formed of a material having a high thermal conductivity, such as Au, Ag, Al, or Cu. The heat sink 23 has the function of dissipating heat generated at the plasmon generator 40. The heat sink 23 is not an essential component of the thermally-assisted magnetic recording head, and can be dispensed with.

The thermally-assisted magnetic recording head further includes a coupling layer 27 formed of a magnetic material and disposed over the third layers of the coupling portions 17A and 17B and the dielectric layer 25, and a dielectric layer 28 disposed around the main pole 26 and the coupling layer 27. The top surfaces of the main pole 26, the coupling layer 27, and the dielectric layer 28 are even with each other. The dielectric layer 28 is formed of alumina, for example.

The thermally-assisted magnetic recording head further includes a coil 29 disposed on the dielectric layer 28, an insulating layer 30 disposed to cover the coil 29, and a yoke layer 31 formed of a magnetic material and disposed over the main pole 26, the coupling layer 27 and the insulating layer 30. The yoke layer 31 magnetically couples the main pole 26 and the coupling layer 27 to each other. The coil 29 is planar spiral-shaped and wound around a part of the yoke layer 31 that lies on the coupling layer 27. The coil 29 is formed of a conductive material such as copper. The insulating layer 30 is formed of alumina, for example.

The thermally-assisted magnetic recording head further includes a protective layer 32 disposed to cover the yoke layer 31. The protective layer 32 is formed of alumina, for example.

The parts from the return pole layer 11 to the yoke layer 31 constitute a write head section. The coils 15 and 29 produce magnetic fields corresponding to data to be written on the recording medium 80. The shield layer 12, the return pole layer 11, the coupling layer 13, the coupling portions 17A and 17B, the coupling layer 27, the yoke layer 31, and the main pole 26 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 26. The main pole 26 allows the magnetic flux corresponding to the magnetic field produced by the coil 15 and the magnetic flux corresponding to the magnetic field produced by the coil 29 to pass, and produces a write magnetic field for writing data on the recording medium 80 by means of a perpendicular magnetic recording system.

As has been described, the thermally-assisted magnetic recording head according to the present embodiment includes the medium facing surface 60, the read head section, and the write head section. The read head section and the write head section are stacked on the substrate 1. The write head section is located on the front side in the direction of travel of the recording medium 80 (the Z direction), i.e., on the trailing side, relative to the read head section.

The thermally-assisted magnetic recording head may include a protective film covering the medium facing surface 60. The protective film is formed of diamond-like-carbon (DLC) or $Ta_2O_5$, for example. The protective film is not an essential component of the thermally-assisted magnetic recording head and can be dispensed with.

The write head section includes the coils 15 and 29, the main pole 26, the waveguide, and the plasmon generator 40. The waveguide includes the core 20 and the cladding. The cladding includes the cladding layers 18, 19, and 21. The main pole 26 is located on the front side in the direction of travel of the recording medium 80 (the Z direction) relative to the core 20. The plasmon generator 40 is interposed between the core 20 and the main pole 26.

Figure 1:
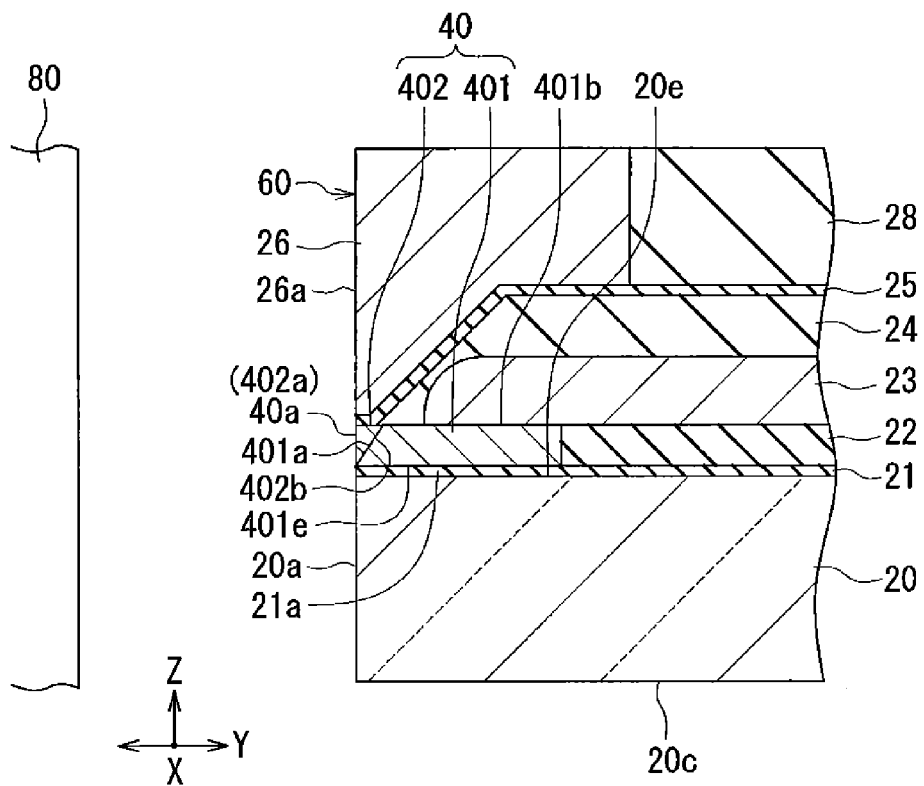
FIG. 1 is a cross-sectional view showing the main part of a thermally-assisted magnetic recording head according to a first embodiment of the invention.
Figure 2:
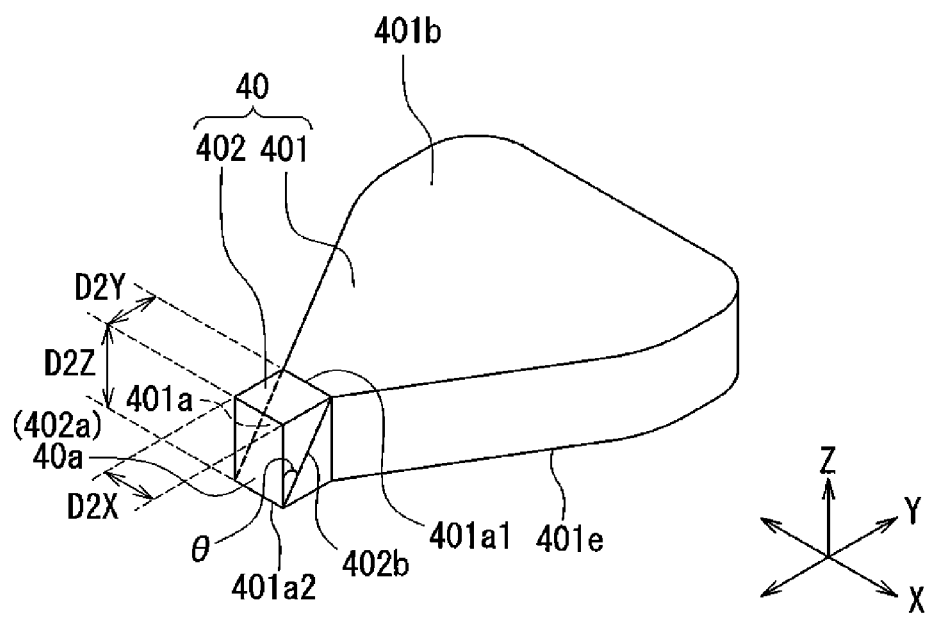
FIG. 2 is a perspective view showing a plasmon generator according to the first embodiment of the invention.
Figure 3:
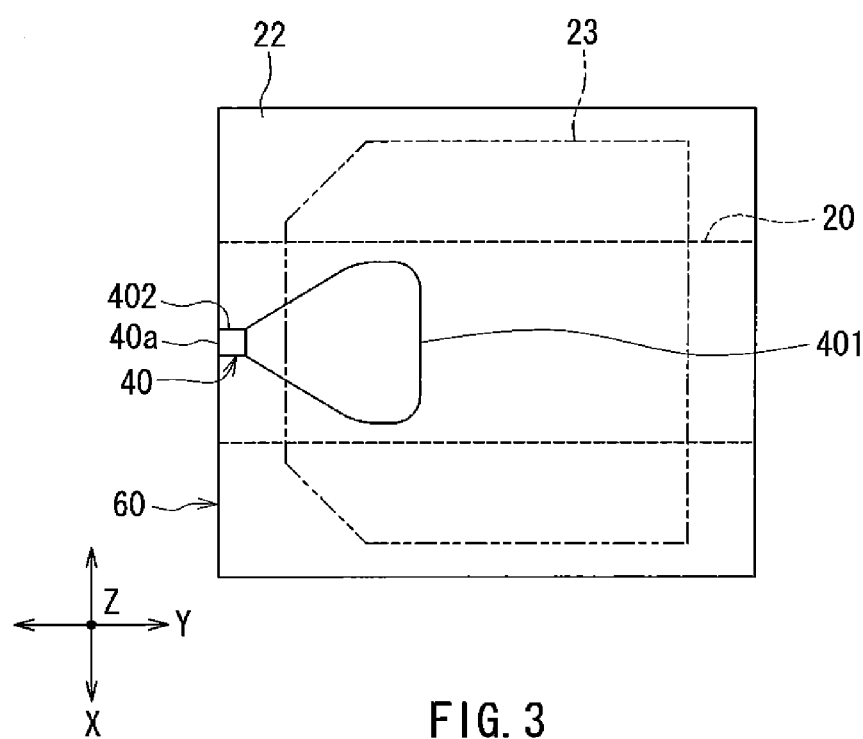
FIG. 3 is a plan view showing the positional relationship between the plasmon generator and the core of the waveguide shown in FIG. 1.

The core 20 and the plasmon generator 40 will now be described in detail with reference to FIG. 1 to FIG. 3. FIG. 1 is a cross-sectional view showing the main part of the thermally-assisted magnetic recording head according to the present embodiment. FIG. 2 is a perspective view showing the plasmon generator 40 according to the present embodiment. FIG. 3 is a plan view showing the positional relationship between the plasmon generator 40 and the core 20 of the waveguide shown in FIG. 1.

As shown in FIG. 1, the core 20 has an end face 20a located in the medium facing surface 60, an evanescent light generating surface 20e or a top surface, a bottom surface 20c, and two side surfaces. The evanescent light generating surface 20e generates evanescent light based on the light propagating through the core 20. The cladding layer 21 covers the evanescent light generating surface 20e.

As shown in FIG. 1 and FIG. 2, the plasmon generator 40 has a front end face 40a located in the medium facing surface 60. The front end face 40a generates near-field light on the principle to be described later. Further, the plasmon generator 40 includes a first portion 401 formed of a first metal material and a second portion 402 formed of a second metal material.

The first portion 401 has an inclined surface 401a facing toward the front end face 40a. As shown in FIG. 2, the inclined surface 401a has a first edge 401a1 farthest from the front end face 40a and a second edge 401a2 closest to the front end face 40a. The distance from the front end face 40a to an arbitrary point on the inclined surface 401a decreases with decreasing distance from the arbitrary point to the second edge 401a2. In the present embodiment, no part of the first portion 401 other than the second edge 401a2 of the inclined surface 401a is located in the front end face 40a. The inclined surface 401a forms an angle θ (see FIG. 2) greater than 0° relative to the front end face 40a. The angle θ preferably falls within the range of 15° to 65°, and more preferably within the range of 30° to 60°.

The first portion 401 further has a first surface 401b connected to the inclined surface 401a at the first edge 401a1 and extending in a direction intersecting the front end face 40a, and a second surface 401e opposite to the first surface 401b. In the present embodiment, in particular, the first surface 401b is the top surface of the first portion 401, and the second surface 401e is the bottom surface of the first portion 401. The first surface 401b and the second surface 401e are perpendicular to the Z direction and extend in the Y direction.

The first portion 401 has a plasmon exciting part configured to excite surface plasmons thereon through coupling with the evanescent light generated from the core 20. In the present embodiment, the second surface 401e of the first portion 401 constitutes the plasmon exciting part. In the following descriptions, the second surface 401e will also be referred to as the plasmon exciting part 401e. The second edge 401a2 of the inclined surface 401a is located at an end of the plasmon exciting part 401e.

As shown in FIG. 1, the plasmon exciting part 401e faces the evanescent light generating surface 20e with a predetermined distance therebetween. The cladding layer 21 includes an interposition part 21a interposed between the evanescent light generating surface 20e and the plasmon exciting part 401e. Since the cladding layer 21 is part of the cladding, the cladding can be said to include the interposition part 21a. The distance between the plasmon exciting part 401e and the evanescent light generating surface 20e, that is, the thickness of the interposition part 21a, is in the range of 10 to 100 nm, for example, and preferably falls within the range of 15 to 50 nm. Surface plasmons excited on the plasmon exciting part 401e propagate to the front end face 40a, and the front end face 40a generates near-field light based on the surface plasmons.

The second portion 402 is located between the inclined surface 401a and the front end face 40a, and includes a first end face 402a located in the front end face 40a and a second end face 402b in contact with the inclined surface 401a. The second portion 402 is wedge-shaped. The second portion 402 is triangular in cross section perpendicular to the X direction.

The second metal material is higher in Vickers hardness than the first metal material. The first metal material is preferably higher in electrical conductivity than the second metal material. The first metal material may be one of Au, Ag, Al, and Cu, for example. The second metal material may be one of Ru, Ni, NiCr, Ta, W, Mo, and Pt, for example.

In the present embodiment, as shown in FIG. 2, the front end face 40a is formed by the first end face 402a of the second portion 402. The dimensions of the first end face 402a in the X direction and the Z direction will be represented by symbols D2X and D2Z, respectively. D2X and D2Z also represent the dimensions of the front end face 40a in the X direction and the Z direction, respectively. D2X falls within the range of 20 to 40 nm, for example. D2Z falls within the range of 20 to 80 nm, for example.

Further, the maximum dimension of the second portion 402 in the Y direction will be represented by symbol D2Y. D2Y also represents the distance between the first edge 401a1 of the inclined surface 401a and the front end face 40a. D2Y falls within the range of 20 to 60 nm, for example.

As shown in FIG. 3, the plasmon generator 40 may include a portion whose width in the X direction decreases toward the front end face 40a.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 4, the laser light 50 propagates through the core 20 toward the medium facing surface 60, and reaches the vicinity of the plasmon generator 40. In the core 20, the laser light 50 is totally reflected at the evanescent light generating surface 20e shown in FIG. 1 to generate evanescent light permeating into the interposition part 21a. In the plasmon generator 40, surface plasmons are excited on the plasmon exciting part 401e through coupling with the aforementioned evanescent light. The surface plasmons propagate to the front end face 40a. As a result, the surface plasmons concentrate at the front end face 40a, and near-field light is generated from the front end face 40a based on the surface plasmons.

The near-field light generated from the front end face 40a is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including rows of a plurality pre-head portions, the plurality of pre-head portions becoming individual thermally-assisted magnetic recording heads later; and separating the plurality of pre-head portions from each other by cutting the substructure and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. In the positions of these two openings, the shield layer 12 and the coupling layer 13 are then formed on the return pole layer 11. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, a dielectric layer to become the core 20 is formed over the entire top surface of the stack. The dielectric layer is then etched in part by, for example, reactive ion etching (hereinafter referred to as RIE), and thereby patterned into the core 20. Next, although not illustrated, the second layers of the coupling portions 17A and 17B are formed on the first layers of the coupling portions 17A and 17B.

Next, the cladding layer 19 is formed over the entire top surface of the stack. The cladding layer 19 is then polished by, for example, CMP, until the dielectric layer and the second layers of the coupling portions 17A and 17B are exposed.

Reference is now made to FIG. 6A through FIG. 13B to describe steps to be performed after the polishing of the cladding layer 19 up to the formation of the dielectric layer 28. FIG. 6A through FIG. 13B each show a stack of layers formed in the process of manufacturing the thermally-assisted magnetic recording head. Note that portions located below the core 20 are omitted from FIG. 6A through FIG. 13B. FIG. 6A to FIG. 13A each show a cross section that intersects the front end face 26a of the main pole 26 and that is perpendicular to the medium facing surface 60 and the top surface 1a of the substrate 1. FIG. 6B to FIG. 13B each show a cross section of the stack taken in the position at which the medium facing surface 60 is to be formed. In FIG. 6A to FIG. 13A, the symbol "ABS" indicates the position at which the medium facing surface 60 is to be formed.

FIG. 6A and FIG. 6B show a step that follows the polishing of the cladding layer 19. In this step, first, the cladding layer 21 is formed over the core 20 and the cladding layer 19. Then, a first metal film 401P, which later becomes the first portion 401, is formed on the cladding layer 21 by sputtering, for example. Next, an etching mask, not illustrated, is formed on the metal film 401P. Using this etching mask, the metal film 401P is then taper-etched by, for example, ion beam etching, to thereby provide the metal film 401P with the inclined surface 401a.

FIG. 7A and FIG. 7B show the next step. In this step, first, a second metal film 402P, which later becomes the second portion 402, is formed on the metal film 401P and the cladding layer 21. The metal film 402P is then polished by, for example, CMP, until the metal film 401P is exposed.

FIG. 8A and FIG. 8B show the next step. In this step, first, an etching mask, not illustrated, is formed on the metal films 401P and 402P. Using this etching mask, portions of the metal films 401P and 402P are then etched by RIE, for example. The remainder of the metal film 401P thereby becomes the first portion 401.

FIG. 9A and FIG. 9B show the next step. In this step, first, the dielectric layer 22 is formed over the entire top surface of the stack. The dielectric layer 22 is then polished by, for example, CMP, until the first portion 401 and the metal film 402P are exposed.

FIG. 10A and FIG. 10B show the next step. In this step, the heat sink 23 is formed to lie astride part of the first portion 401 and part of the dielectric layer 22.

FIG. 11A and FIG. 11B show the next step. In this step, first, the dielectric layer 24 is formed to cover the heat sink 23. Then, the dielectric layer 25 is formed to cover the dielectric layer 24.

Figure 12A:
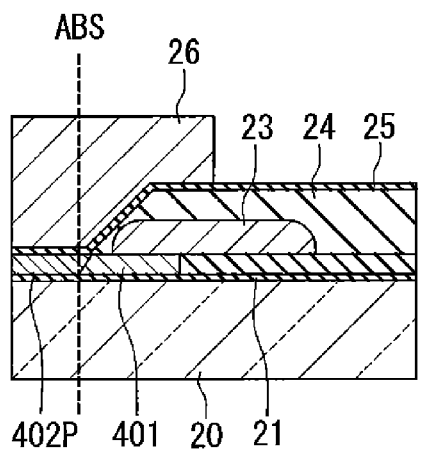
FIG. 12A and FIG. 12B are cross-sectional views showing a step that follows the step shown in FIG. 11A and FIG. 11B.
Figure 12B:
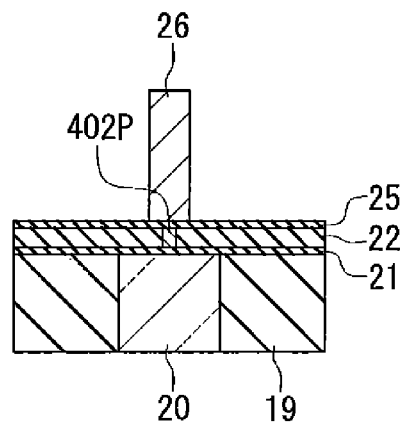

FIG. 12A and FIG. 12B show the next step. In this step, first, the cladding layer 21 and the dielectric layers 22, 24 and 25 are selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the dielectric layer 25, and the coupling layer 27 is formed on the third layers of the coupling portions 17A and 17B and the dielectric layer 25.

Figure 13A:
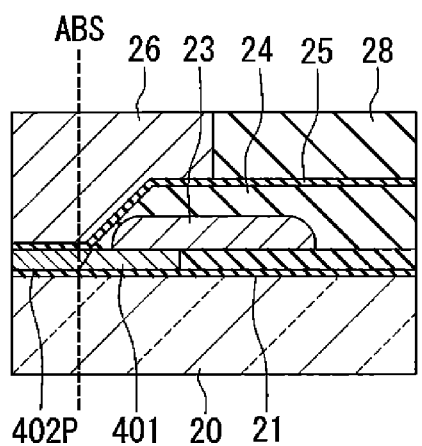
FIG. 13A and FIG. 13B are cross-sectional views showing a step that follows the step shown in FIG. 12A and FIG. 12B.
Figure 13B:
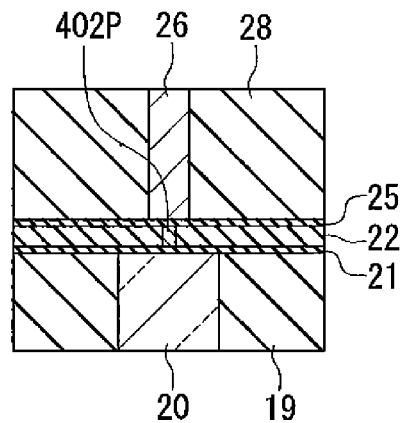

FIG. 13A and FIG. 13B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other.

Now, steps to follow the step of FIG. 13A and FIG. 13B will be described with reference to FIG. 4 and FIG. 5. First, the coil 29 is formed on the dielectric layer 28. The insulating layer 30 is then formed to cover the coil 29. Next, the yoke layer 31 is formed over the main pole 26, the coupling layer 27 and the insulating layer 30. Then, the protective layer 32 is formed to cover the yoke layer 31. Wiring, terminals, and other components are then formed on the top surface of the protective layer 32. When the substructure is completed thus, the step of forming the medium facing surface 60 is performed. By forming the medium facing surface 60, the first end face 402a is formed and the second metal film 402P thereby becomes the second portion 402. The plasmon generator 40 is thus completed. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, ion beam etching, after the polishing step.

The effects of the plasmon generator 40 and the thermally-assisted magnetic recording head according to the present embodiment will now be described. The plasmon generator 40 according to the present embodiment includes the first portion 401 formed of the first metal material and the second portion 402 formed of the second metal material. The second metal material is higher in Vickers hardness than the first metal material. The first portion 401 has the inclined surface 401a. The second portion 402 is located between the inclined surface 401a and the front end face 40a. No part of the first portion 401 other than the second edge 401a2 of the inclined surface 401a is located in the front end face 40a. The first portion 401 is thus protected by the second portion 402. Accordingly, the first metal material can be selected from any metal materials that have high electrical conductivities and are suitable for excitation and propagation of surface plasmons, without the need for considering mechanical strength. This allows appropriate excitation and propagation of surface plasmons on the first portion 401.

The front end face 40a of the plasmon generator 40 is formed by the first end face 402a of the second portion 402. This makes it possible to prevent the front end face 40a from being significantly recessed relative to the other parts of the medium facing surface 60 in the step of forming the medium facing surface 60. Consequently, according to the present embodiment, it is possible to prevent degradation in heating performance of the plasmon generator 40 that would occur where the front end face 40a is significantly recessed relative to the other parts of the medium facing surface 60.

Further, the present embodiment makes it possible to prevent the second layer 402 from being deformed or damaged due to a temperature change of the plasmon generator 40, and also prevent the front end face 40a from being significantly recessed relative to the other parts of the medium facing surface 60 due to a temperature change of the plasmon generator 40.

Now, a description will be given of the effects provided by the configuration in which the first portion 401 has the inclined surface 401a. First, a comparative example will be contemplated in which the first portion 401 has an end face parallel to the front end face 40a in place of the inclined surface 401a, and the second portion 402 is shaped like a rectangular solid and located between the aforementioned end face and the front end face 40a. In this comparative example, if the second portion 402 is increased in dimension in the Y direction in order to enhance the function of the second portion 402 to protect the first portion 401, the distance between the first portion 401 and the front end face 40a increases. This makes it difficult to allow surface plasmons excited on the plasmon exciting part 401e to propagate to the front end face 40a efficiently. On the other hand, in the comparative example, decreasing the dimension of the second portion 402 in the Y direction would reduce the mechanical strength of the second portion 402, so that the second portion 402 may be damaged in the step of forming the medium facing surface 60 or due to a temperature change of the plasmon generator 40.

In the present embodiment, in contrast, since the first portion 401 has the inclined surface 401a, it is possible to bring part of the first portion 401, that is, a portion near the second edge 401a2 of the inclined surface 401a, into close proximity to the front end face 40a, while allowing the second portion 402 to be large in volume and thus sufficiently high in mechanical strength. This makes it possible for the surface plasmons excited on the plasmon exciting part 401e to propagate to the front end face 40a efficiently.

Further, in the present embodiment, the second edge 401a2 of the inclined surface 401a is located at an end of the plasmon exciting part 401e. This makes it possible for the surface plasmons excited on the plasmon exciting part 401e to propagate to the front end face 40a more efficiently.

As can be seen from the foregoing, according to the present embodiment, it is possible to provide the plasmon generator 40 that has high reliability and allows surface plasmons to propagate to the front end face 40a efficiently, and to provide a thermally-assisted magnetic recording head having the plasmon generator 40.

Second Embodiment

Figure 14:
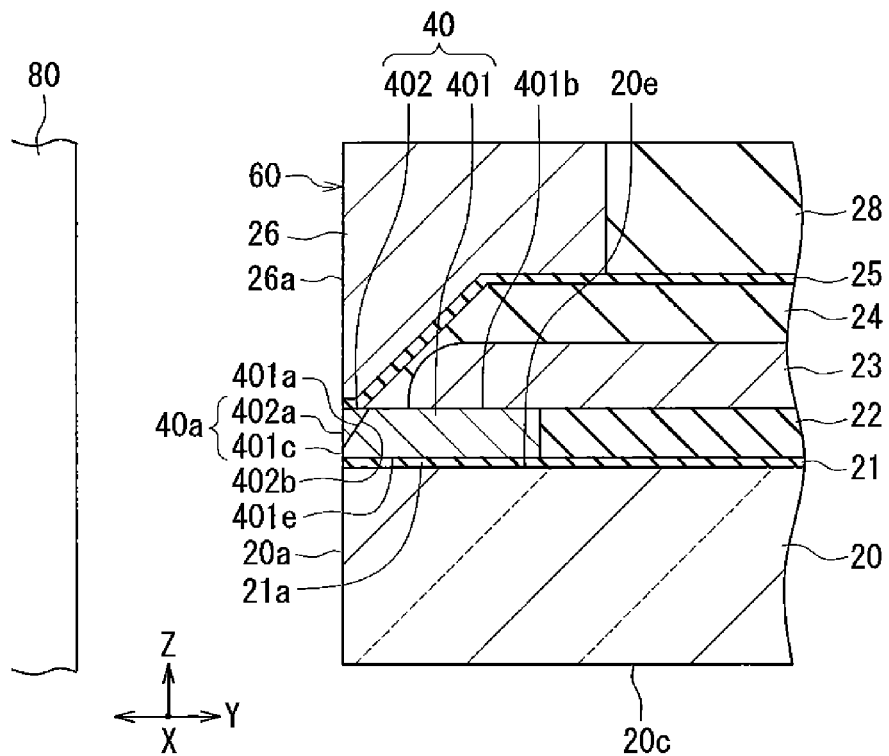
FIG. 14 is a cross-sectional view showing the main part of a thermally-assisted magnetic recording head according to a second embodiment of the invention.
Figure 15:
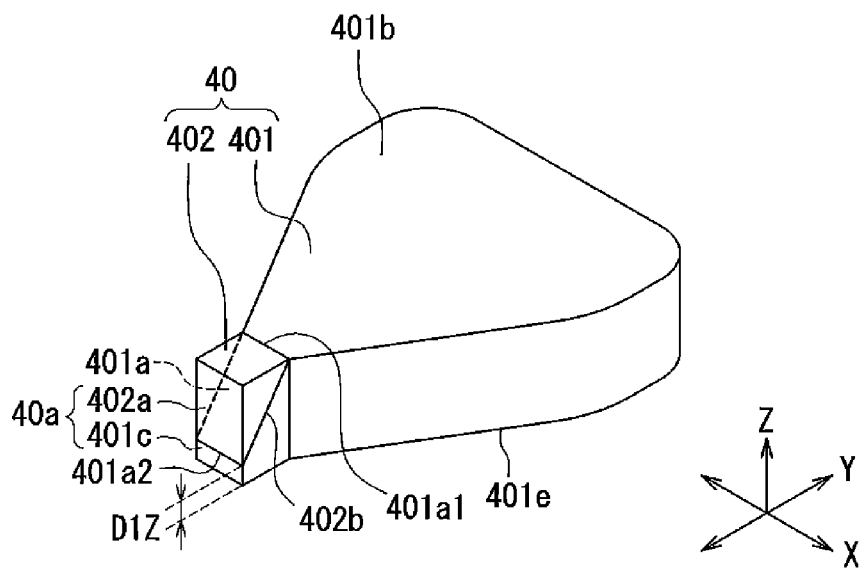
FIG. 15 is a perspective view showing a plasmon generator according to the second embodiment of the invention.

A plasmon generator and a thermally-assisted magnetic recording head according to a second embodiment of the invention will now be described with reference to FIG. 14 and FIG. 15. FIG. 14 is a cross-sectional view showing the main part of the thermally-assisted magnetic recording head according to the present embodiment. FIG. 15 is a perspective view showing the plasmon generator according to the present embodiment. The configuration of the thermally-assisted magnetic recording head according to the present embodiment, except the plasmon generator 40, is the same as that in the first embodiment.

In the plasmon generator 40 according to the present embodiment, the first portion 401 has an end face 401c located in the front end face 40a. The end face 401c is located on the rear side in the direction of travel of the recording medium 80 (the Z direction), that is, on the leading side, relative to the first end face 402a of the second portion 402. The upper end of the end face 401c coincides with the second edge 401a2 of the inclined surface 401a. The lower end of the end face 401c is located at an end of the plasmon exciting part 401e.

The end face 401c is smaller in area than the first end face 402a of the second portion 402. The dimension of the end face 401c in the Z direction will be represented by symbol D1Z. D1Z falls within the range of 1 to 20 nm, for example. The dimension of the end face 401c in the X direction is equal to the dimension of the first end face 402a in the X direction, for example.

In the present embodiment, the front end face 40a of the plasmon generator 40 is composed of the first end face 402a of the second portion 402 and the end face 401c of the first portion 401. Since the end face 401c is smaller in area than the first end face 402a, the first end face 402a constitutes the major part of the front end face 40a. The second metal material forming the second portion 402 is higher in Vickers hardness than the first metal material forming the first portion 401. This makes it possible to prevent the front end face 40a from being significantly recessed relative to the other parts of the medium facing surface 60, as with the first embodiment.

The plasmon generator 40 according to the present embodiment can be formed in the same manner as the first embodiment, except that the thickness of the first portion 401 is made greater by D1Z than in the first embodiment.

The remainder of configuration, function and effects of the present embodiment are similar to those of the first embodiment.

Third Embodiment

Figure 16:
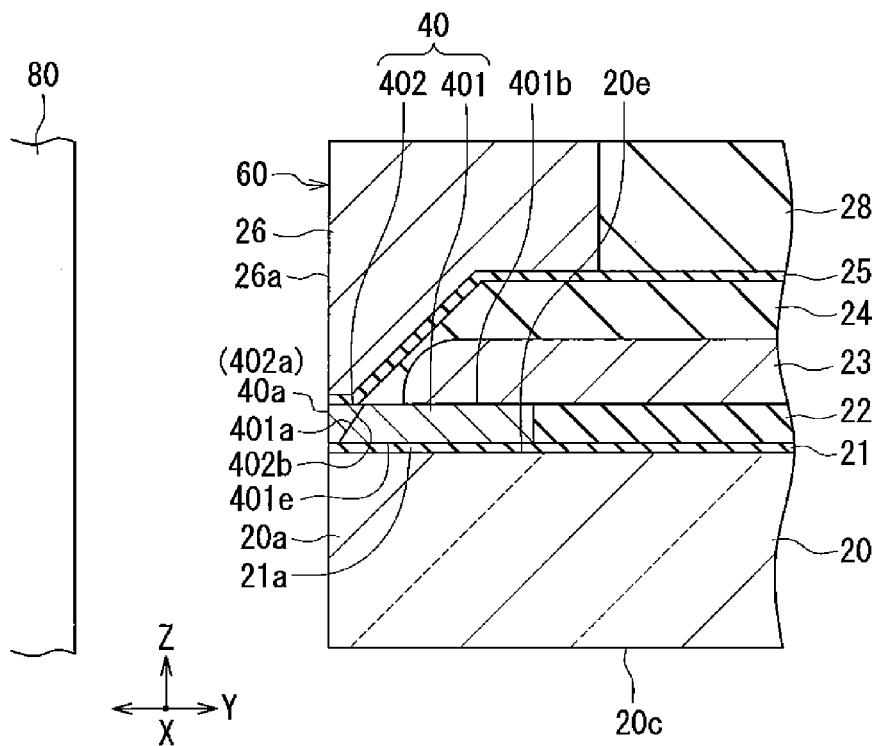
FIG. 16 is a cross-sectional view showing the main part of a thermally-assisted magnetic recording head according to a third embodiment of the invention.
Figure 17:
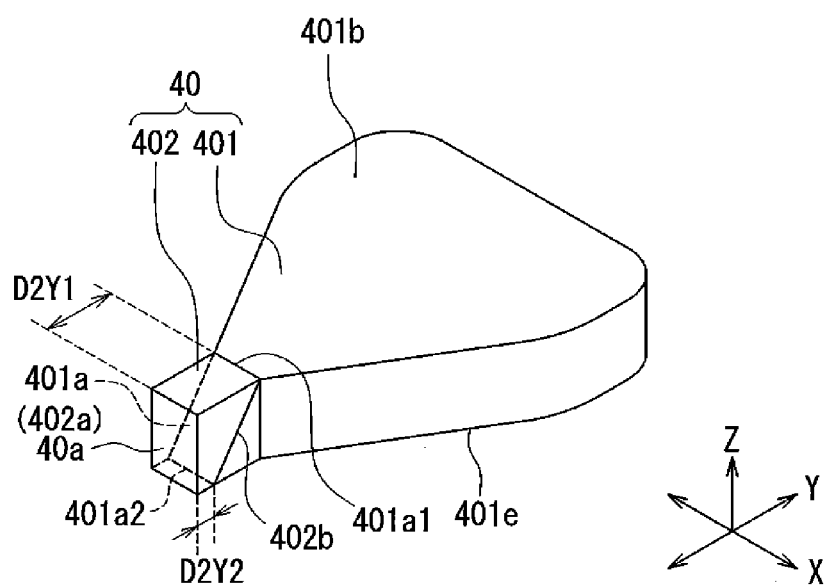
FIG. 17 is a perspective view showing a plasmon generator according to the third embodiment of the invention.

A plasmon generator and a thermally-assisted magnetic recording head according to a third embodiment of the invention will now be described with reference to FIG. 16 and FIG. 17. FIG. 16 is a cross-sectional view showing the main part of the thermally-assisted magnetic recording head according to the present embodiment. FIG. 17 is a perspective view showing the plasmon generator according to the present embodiment. The configuration of the thermally-assisted magnetic recording head according to the present embodiment, except the plasmon generator 40, is the same as that in the first embodiment.

In the plasmon generator 40 according to the present embodiment, the second edge 401a2 of the inclined surface 401a is located at a distance from the front end face 40a, and no part of the first portion 401 constitutes part of the front end face 40a. The second portion 402 is trapezoidal in cross section perpendicular to the X direction.

The distance between the first edge 401a1 of the inclined surface 401a and the front end face 40a will be represented by symbol D2Y1, and the distance between the second edge 401a2 of the inclined surface 401a and the front end face 40a will be represented by symbol D2Y2. D2Y1 falls within the range of 20 to 80 nm, for example. D2Y2 is smaller than D2Y1 and falls within the range of 1 to 20 nm, for example.

The plasmon generator 40 according to the present embodiment can be formed in the same manner as the first embodiment, except that the positions of the inclined surface 401a and the second end face 402b of the second portion 402 are shifted to be farther from the front end face 40a than in the first embodiment by D2Y2.

The remainder of configuration, function and effects of the present embodiment are similar to those of the first embodiment.

Fourth Embodiment

Figure 18:
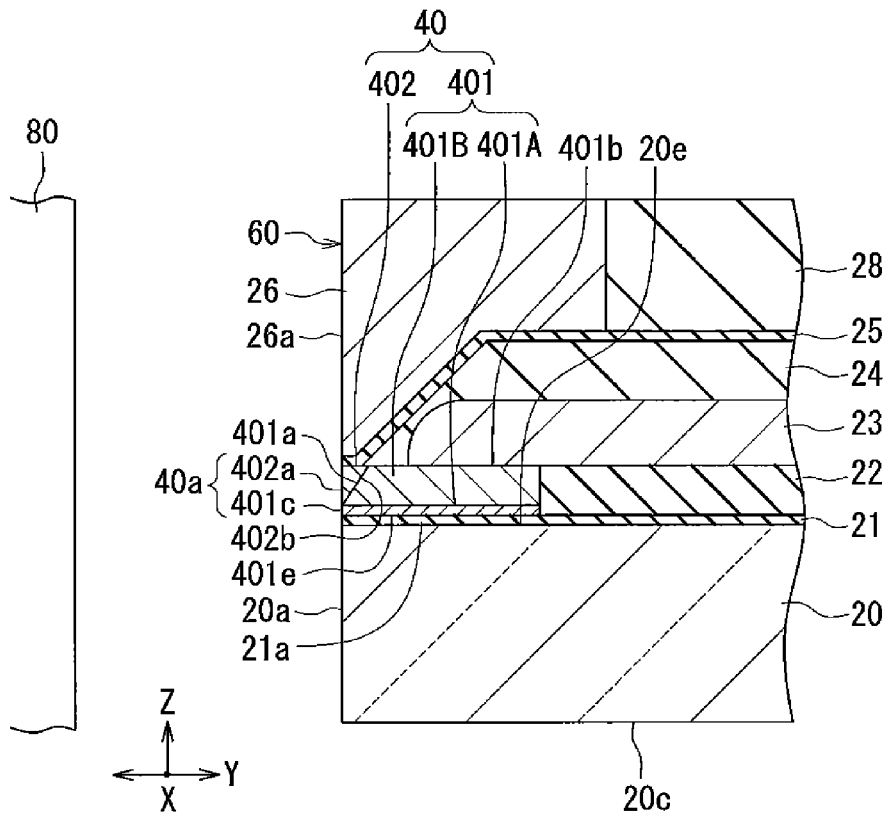
FIG. 18 is a cross-sectional view showing the main part of a thermally-assisted magnetic recording head according to a fourth embodiment of the invention.
Figure 19:
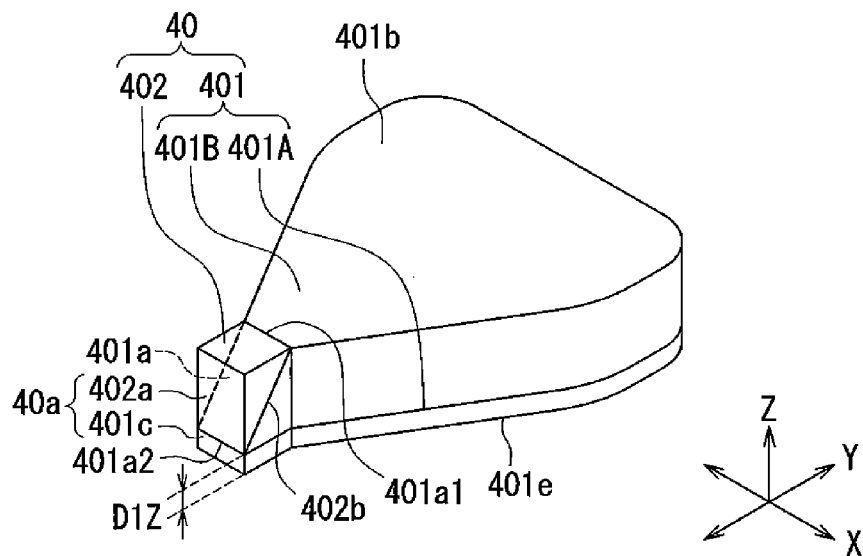
FIG. 19 is a perspective view showing a plasmon generator according to the fourth embodiment of the invention.

A plasmon generator and a thermally-assisted magnetic recording head according to a fourth embodiment of the invention will now be described with reference to FIG. 18 and FIG. 19. FIG. 18 is a cross-sectional view showing the main part of the thermally-assisted magnetic recording head according to the present embodiment. FIG. 19 is a perspective view showing the plasmon generator according to the present embodiment. The configuration of the thermally-assisted magnetic recording head according to the present embodiment, except the plasmon generator 40, is the same as that in the first embodiment.

In the plasmon generator 40 according to the present embodiment, the first portion 401 includes a first layer 401A and a second layer 401B stacked. The first layer 401A lies on the cladding layer 21. The second layer 401B lies on the first layer 401A. The plasmon exciting part 401e is formed by the bottom surface of the first layer 401A. The first surface (the top surface) 401b of the first portion 401 is formed by the top surface of the second layer 401B. The overall shape of the first portion 401 is the same as that in the second embodiment (see FIG. 14 and FIG. 15).

The first layer 401A has an end face 401c located in the front end face 40a. The second layer 401B has the inclined surface 401a. The upper end of the end face 401c coincides with the second edge 401a2 of the inclined surface 401a. The lower end of the end face 401c is located at an end of the plasmon exciting part 401e. The end face 401c is smaller in area than the first end face 402a of the second portion 402.

Each of the first layer 401A and the second layer 401B is formed of the first metal material which is lower in Vickers hardness than the second metal material. The material of the first layer 401A and that of the second layer 401B may be the same or different.

The plasmon generator 40 according to the present embodiment can be formed in the same manner as the first embodiment, except for forming a first film that later becomes the first layer 401A, then forming a second film that later becomes the second layer 401B, and then providing the second film with the inclined surface 401a.

The remainder of configuration, function and effects of the present embodiment are similar to those of the first or second embodiment.

Fifth Embodiment

Figure 20:
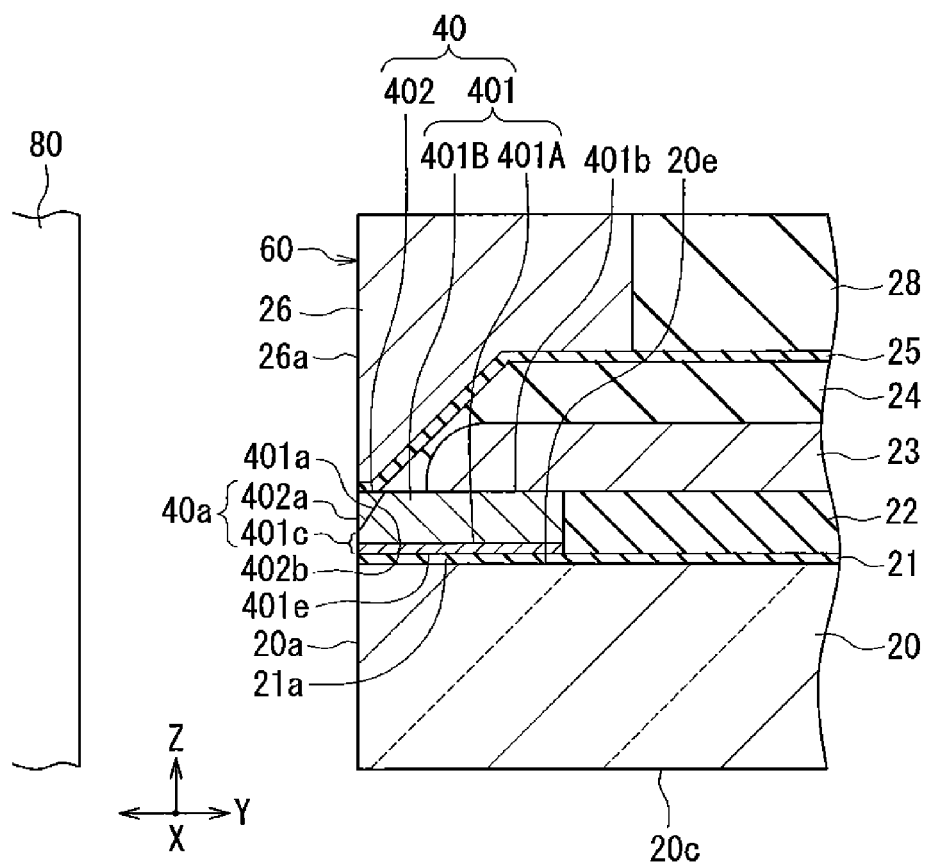
FIG. 20 is a cross-sectional view showing the main part of a thermally-assisted magnetic recording head according to a fifth embodiment of the invention.
Figure 21:
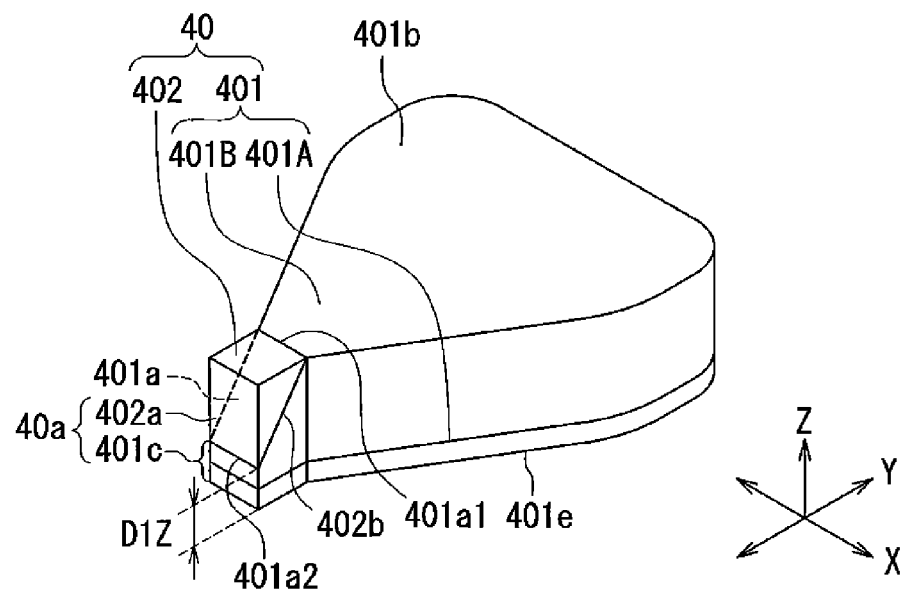
FIG. 21 is a perspective view showing a plasmon generator according to the fifth embodiment of the invention.

A plasmon generator and a thermally-assisted magnetic recording head according to a fifth embodiment of the invention will now be described with reference to FIG. 20 and FIG. 21. FIG. 20 is a cross-sectional view showing the main part of the thermally-assisted magnetic recording head according to the present embodiment. FIG. 21 is a perspective view showing the plasmon generator according to the present embodiment. The configuration of the thermally-assisted magnetic recording head according to the present embodiment, except the plasmon generator 40, is the same as that in the first embodiment.

In the plasmon generator 40 according to the present embodiment, the first portion 401 has an end face 401c located in the front end face 40a, as in the second embodiment. The upper end of the end face 401c coincides with the second edge 401a2 of the inclined surface 401a. The lower end of the end face 401c is located at an end of the plasmon exciting part 401e. The end face 401c is smaller in area than the first end face 402a of the second portion 402.

Further, in the present embodiment, the first portion 401 includes a first layer 401A and a second layer 401B stacked, as in the fourth embodiment. The first layer 401A has an end face located in the front end face 40a. The second layer 401B has the inclined surface 401a, and an end face located in the front end face 40a. The end face 401c of the first portion 401 is composed of the end face of the first layer 401A and the end face of the second layer 401B.

The plasmon generator 40 according to the present embodiment can be formed in the same manner as the fourth embodiment, except that the second film that later becomes the second layer 401B is made thicker than in the fourth embodiment.

The remainder of configuration, function and effects of the present embodiment are similar to those of the fourth embodiment.

Sixth Embodiment

Figure 22:
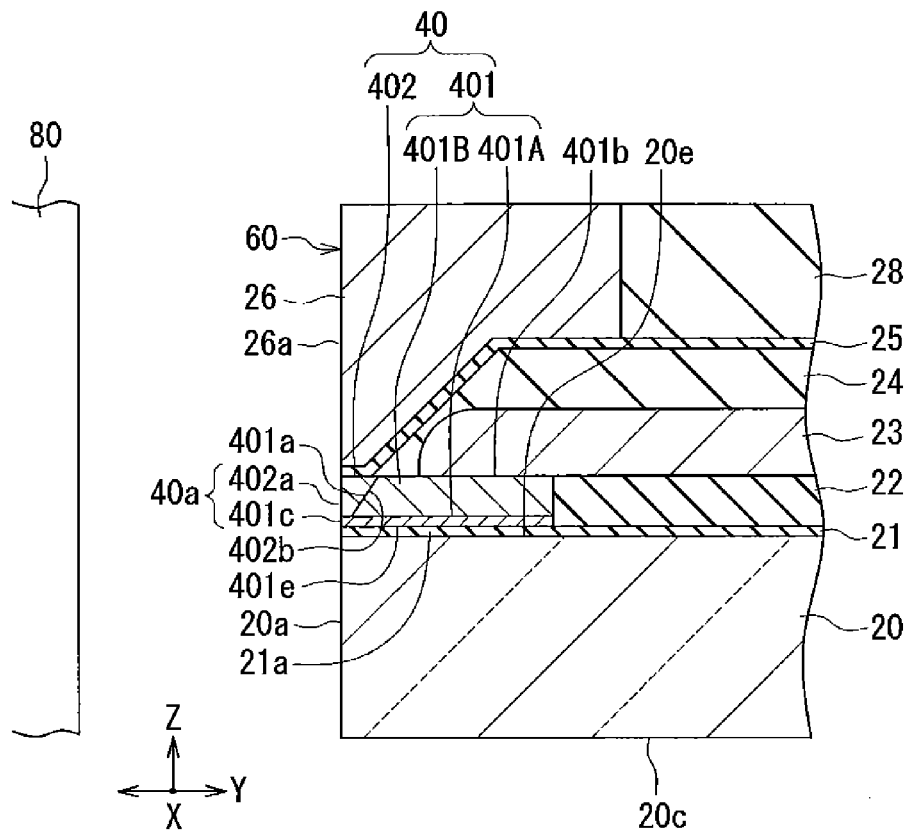
FIG. 22 is a cross-sectional view showing the main part of a thermally-assisted magnetic recording head according to a sixth embodiment of the invention.
Figure 23:
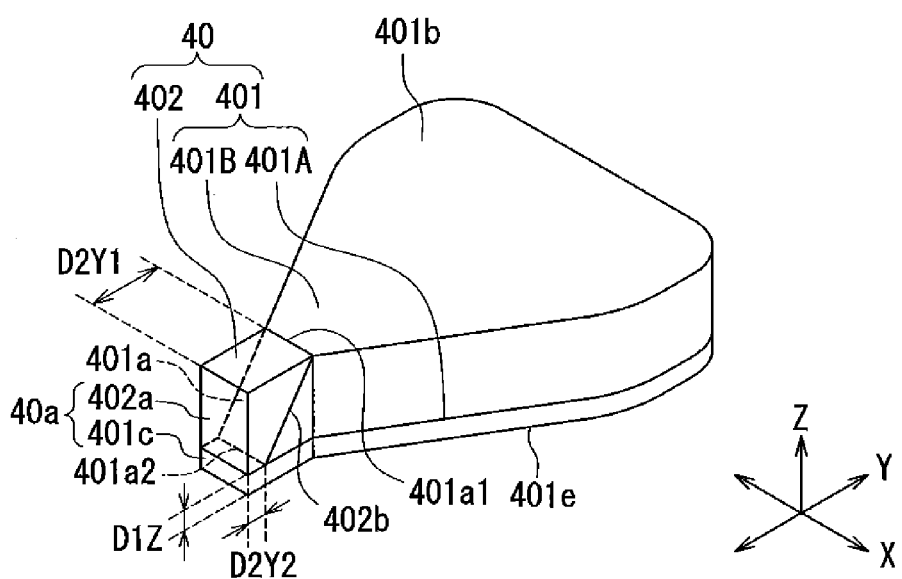
FIG. 23 is a perspective view showing a plasmon generator according to the sixth embodiment of the invention.

A plasmon generator and a thermally-assisted magnetic recording head according to a sixth embodiment of the invention will now be described with reference to FIG. 22 and FIG. 23. FIG. 22 is a cross-sectional view showing the main part of the thermally-assisted magnetic recording head according to the present embodiment. FIG. 23 is a perspective view showing the plasmon generator according to the present embodiment. The configuration of the thermally-assisted magnetic recording head according to the present embodiment, except the plasmon generator 40, is the same as that in the first embodiment.

In the plasmon generator 40 according to the present embodiment, the second edge 401a2 of the inclined surface 401a is located at a distance from the front end face 40a, as in the third embodiment. The second portion 402 is trapezoidal in cross section perpendicular to the X direction.

Further, in the present embodiment, the first portion 401 includes a first layer 401A and a second layer 401B stacked, as in the fourth embodiment. The first layer 401A has an end face 401c located in the front end face 40a. The second layer 401B has the inclined surface 401a.

The plasmon generator 40 according to the present embodiment can be formed in the same manner as the fourth embodiment, except that the positions of the inclined surface 401a and the second end face 402b of the second portion 402 are shifted to be farther from the front end face 40a than in the fourth embodiment by D2Y2 shown in FIG. 17.

In the present embodiment, the first portion 401 having the shape shown in FIG. 22 and FIG. 23 may be formed of a single layer. The remainder of configuration, function and effects of the present embodiment are similar to those of the third or fourth embodiment.

Seventh Embodiment

Figure 26:
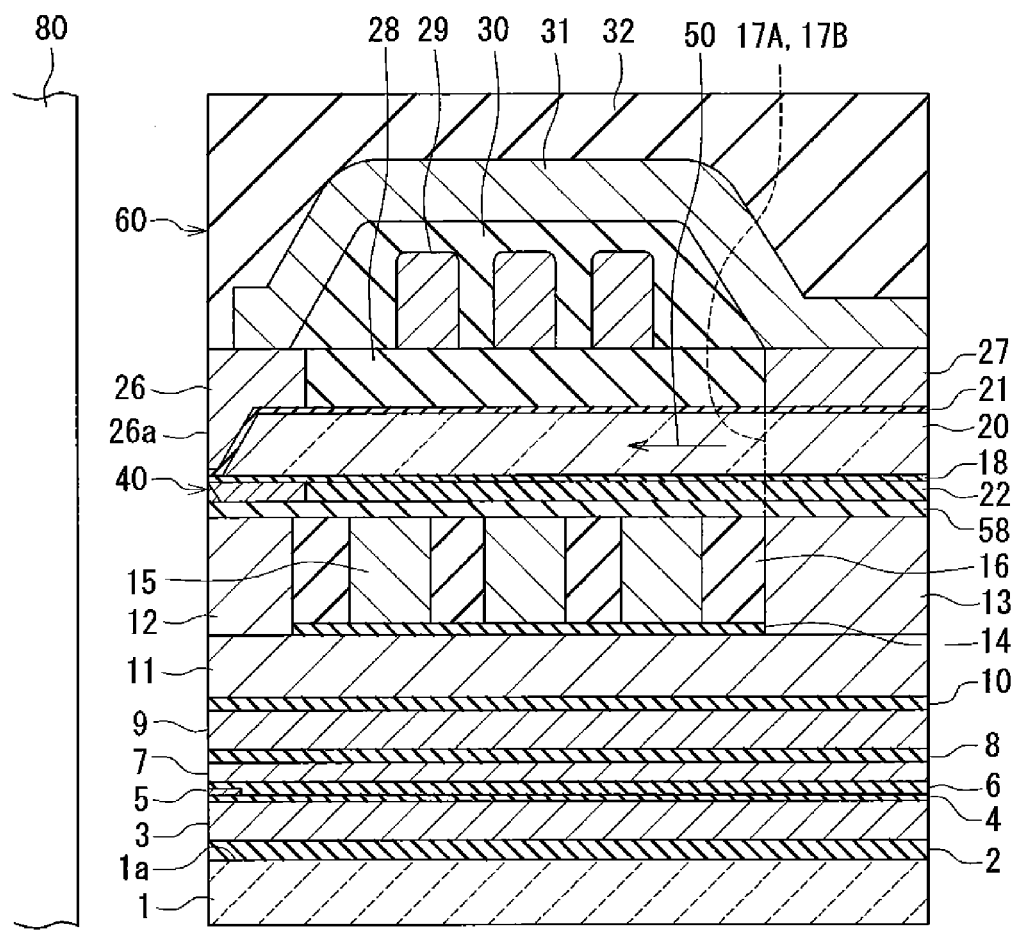
FIG. 26 is a cross-sectional view showing the configuration of the thermally-assisted magnetic recording head according to the seventh embodiment of the invention.
Figure 27:
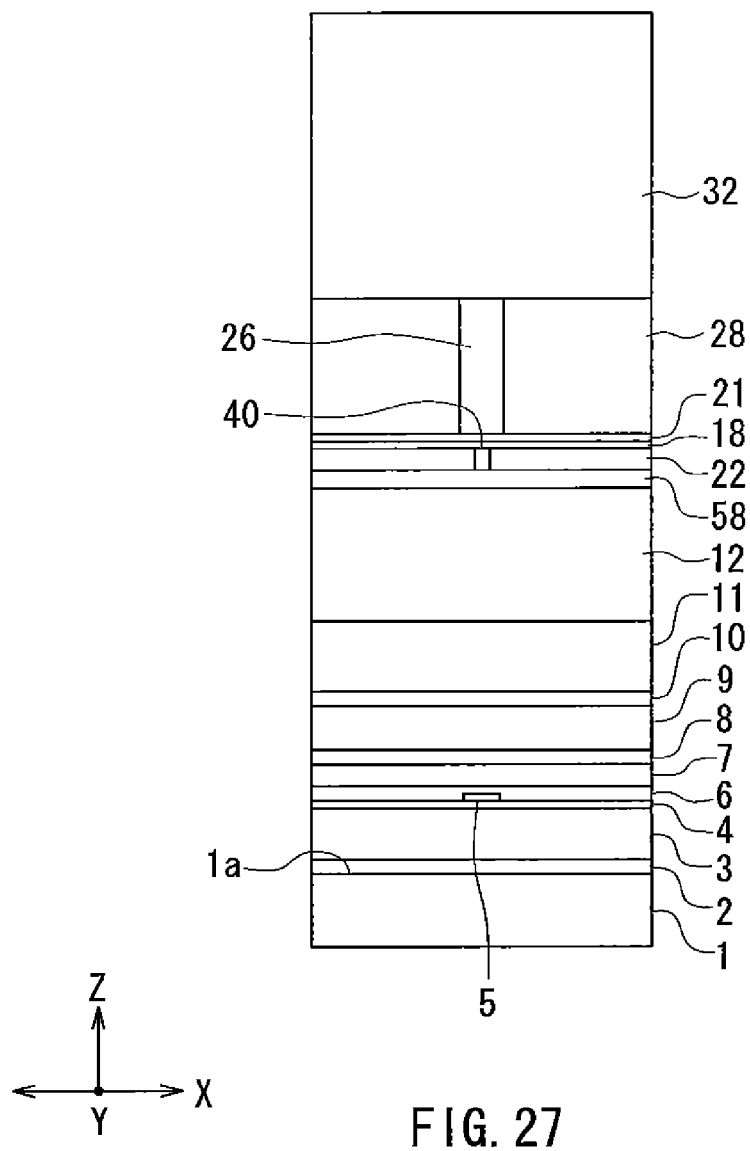
FIG. 27 is a front view showing the medium facing surface of the thermally-assisted magnetic recording head according to the seventh embodiment of the invention.

A plasmon generator and a thermally-assisted magnetic recording head according to a seventh embodiment of the invention will now be described. First, reference is made to FIG. 26 and FIG. 27 to describe the configuration of the thermally-assisted magnetic recording head according to the present embodiment. The thermally-assisted magnetic recording head according to the present embodiment includes the plasmon generator according to the present embodiment. FIG. 26 is a cross-sectional view showing the configuration of the thermally-assisted magnetic recording head. FIG. 27 is a front view showing the medium facing surface of the thermally-assisted magnetic recording head.

Now, a description will be given of how the thermally-assisted magnetic recording head according to the present embodiment differs from the thermally-assisted magnetic recording head according to the first embodiment. The thermally-assisted magnetic recording head according to the present embodiment has a dielectric layer 58 disposed over the shield layer 12, the coupling layer 13, the coil 15 and the insulating layer 16. The dielectric layer 58 is formed of $SiO_2$ or alumina, for example. The plasmon generator 40 according to the present embodiment and the dielectric layer 22 therearound are disposed on the dielectric layer 58.

In the present embodiment, the cladding layer 18 lies on the plasmon generator 40 and the dielectric layer 22. The core 20 lies on the cladding layer 18. Although not illustrated, the cladding layer 19 lies on the cladding layer 18 and surrounds the core 20. The cladding layer 21 lies on the core 20 and the cladding layer 19. The main pole 26 and the dielectric layer 28 therearound are disposed on the cladding layer 21.

The heat sink 23 and the dielectric layers 24 and 25 are not provided in the present embodiment. The coupling portions 17A and 17B are embedded in the dielectric layer 58, the dielectric layer 22, and the cladding layers 18, 19 and 21.

Figure 24:
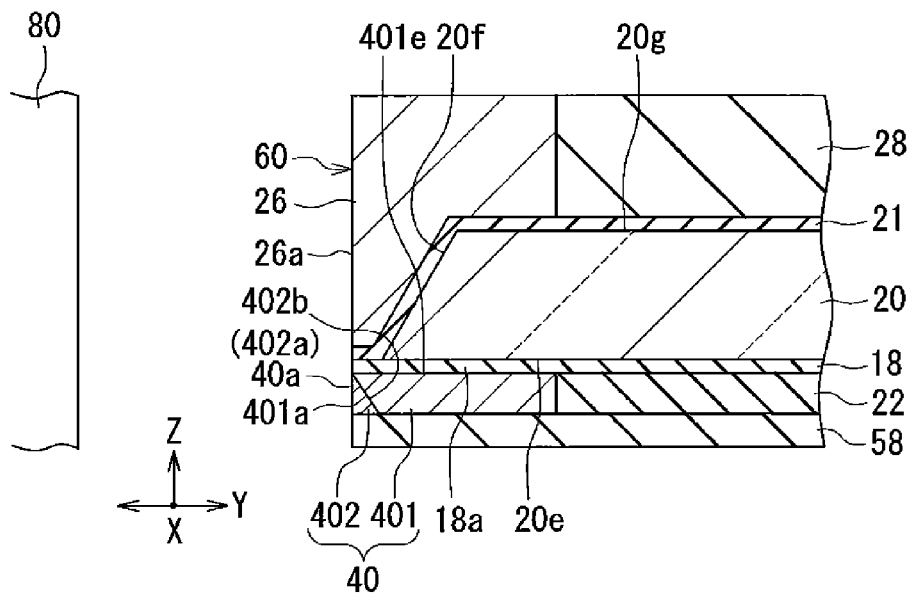
FIG. 24 is a cross-sectional view showing the main part of a thermally-assisted magnetic recording head according to a seventh embodiment of the invention.
Figure 25:
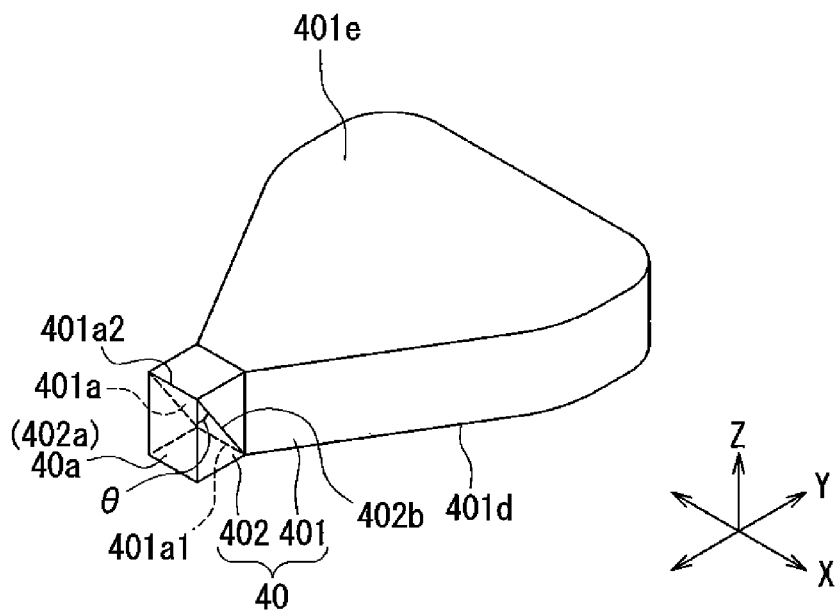
FIG. 25 is a perspective view showing a plasmon generator according to the seventh embodiment of the invention.

The core 20 and the plasmon generator 40 according to the present embodiment will now be described in detail with reference to FIG. 24 and FIG. 25. FIG. 24 is a cross-sectional view showing the main part of the thermally-assisted magnetic recording head according to the present embodiment. FIG. 25 is a perspective view showing the plasmon generator 40 according to the present embodiment.

As shown in FIG. 24, the core 20 of the present embodiment has an end face 20f facing toward the medium facing surface 60, an evanescent light generating surface 20e or a bottom surface, a top surface 20g, and two side surfaces. The evanescent light generating surface 20e generates evanescent light based on the light propagating through the core 20. The distance from the medium facing surface 60 to an arbitrary point on the end face 20f of the core 20 decreases with decreasing distance from the arbitrary point to the top surface 1a of the substrate 1. The main pole 26 includes a portion lying between the end face 20f of the core 20 and the medium facing surface 60.

As shown in FIG. 24 and FIG. 25, the plasmon generator 40 according to the present embodiment is upside down from that according to the first embodiment (see FIG. 1 and FIG. 2). The plasmon generator 40 has a front end face 40a located in the medium facing surface 60. Further, the plasmon generator 40 includes a first portion 401 formed of the first metal material and a second portion 402 formed of the second metal material.

The first portion 401 has an inclined surface 401a facing toward the front end face 40a. The inclined surface 401a has a first edge 401a1 farthest from the front end face 40a and a second edge 401a2 closest to the front end face 40a. The distance from the front end face 40a to an arbitrary point on the inclined surface 401a decreases with decreasing distance from the arbitrary point to the second edge 401a2. In the present embodiment, no part of the first portion 401 other than the second edge 401a2 of the inclined surface 401a is located in the front end face 40a. The preferred range of the angle θ (see FIG. 25) that the inclined surface 401a forms relative to the front end face 40a is the same as that in the first embodiment.

The first portion 401 further has a first surface 401d connected to the inclined surface 401a at the first edge 401a1 and extending in a direction intersecting the front end face 40a, and a second surface 401e opposite to the first surface 401d. In the present embodiment, in particular, the first surface 401d is the bottom surface of the first portion 401, and the second surface 401e is the top surface of the first portion 401. The first surface 401d and the second surface 401e are perpendicular to the Z direction and extend in the Y direction.

In the present embodiment, the second surface 401e of the first portion 401 constitutes the plasmon exciting part. In the following descriptions, the second surface 401e will also be referred to as the plasmon exciting part 401e. The second edge 401a2 of the inclined surface 401a is located at an end of the plasmon exciting part 401e.

As shown in FIG. 24, the plasmon exciting part 401e faces the evanescent light generating surface 20e with a predetermined distance therebetween. The cladding layer 18 includes an interposition part 18a interposed between the evanescent light generating surface 20e and the plasmon exciting part 401e. Since the cladding layer 18 is part of the cladding, the cladding can be said to include the interposition part 18a. The distance between the plasmon exciting part 401e and the evanescent light generating surface 20e, that is, the thickness of the interposition part 18a, is in the range of 10 to 100 nm, for example, and preferably falls within the range of 15 to 50 nm. Surface plasmons excited on the plasmon exciting part 401e propagate to the front end face 40a, and the front end face 40a generates near-field light based on the surface plasmons.

The second portion 402 is located between the inclined surface 401a and the front end face 40a, and includes a first end face 402a located in the front end face 40a and a second end face 402b in contact with the inclined surface 401a. The second portion 402 of the present embodiment has the same shape and dimensions as the second portion 402 of the first embodiment, except for being upside down therefrom.

As in the first embodiment, laser light emitted from a laser diode (not illustrated) enters the core 20. As shown in FIG. 26, the laser light 50 propagates through the core 20 toward the medium facing surface 60, and reaches the vicinity of the plasmon generator 40. In the core 20, the laser light 50 is totally reflected at the evanescent light generating surface 20e shown in FIG. 24 to generate evanescent light permeating into the interposition part 18a. In the plasmon generator 40, surface plasmons are excited on the plasmon exciting part 401e through coupling with the aforementioned evanescent light. The surface plasmons propagate to the front end face 40a. As a result, the surface plasmons concentrate at the front end face 40a, and near-field light is generated from the front end face 40a based on the surface plasmons.

In the method of manufacturing the thermally-assisted magnetic recording head according to the present embodiment, the dielectric layer 58, not the cladding layer 18, is formed over the shield layer 12, the coupling layer 13, the coil 15 and the insulating layer 16. Then, a second metal film that later becomes the second portion 402 is formed on the dielectric layer 58. The second metal film is then taper-etched to thereby provide the second metal film with the second end face 402b. Next, a first metal film that later becomes the first portion 401 is formed on the second metal film and the dielectric layer 58. The first metal film is then polished by, for example, CMP, until the second metal film is exposed. Then, an etching mask, not illustrated, is formed on the first and second metal films. Using this etching mask, portions of the first and second metal films are then etched by RIE, for example. The remainder of the first metal film thereby becomes the first portion 401.

Next, the dielectric layer 22 is formed over the entire top surface of the stack. The dielectric layer 22 is then polished by, for example, CMP, until the first portion 401 and the second metal film are exposed. Next, the cladding layer 18 is formed over the entire top surface of the stack. The remaining components of the thermally-assisted magnetic recording head are then formed to complete the substructure. Then, the step of forming the medium facing surface 60 is performed. By forming the medium facing surface 60, the first end face 402a is formed and the second metal film thereby becomes the second portion 402. The plasmon generator 40 is thus completed.

The remainder of configuration, function and effects of the present embodiment are similar to those of the first embodiment.

Eighth Embodiment

Figure 28:
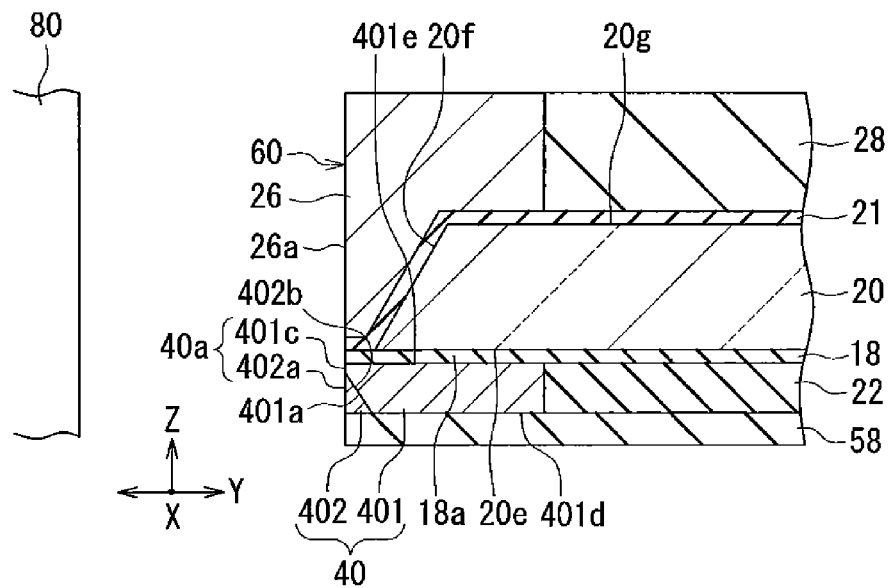
FIG. 28 is a cross-sectional view showing the main part of a thermally-assisted magnetic recording head according to an eighth embodiment of the invention.
Figure 29:
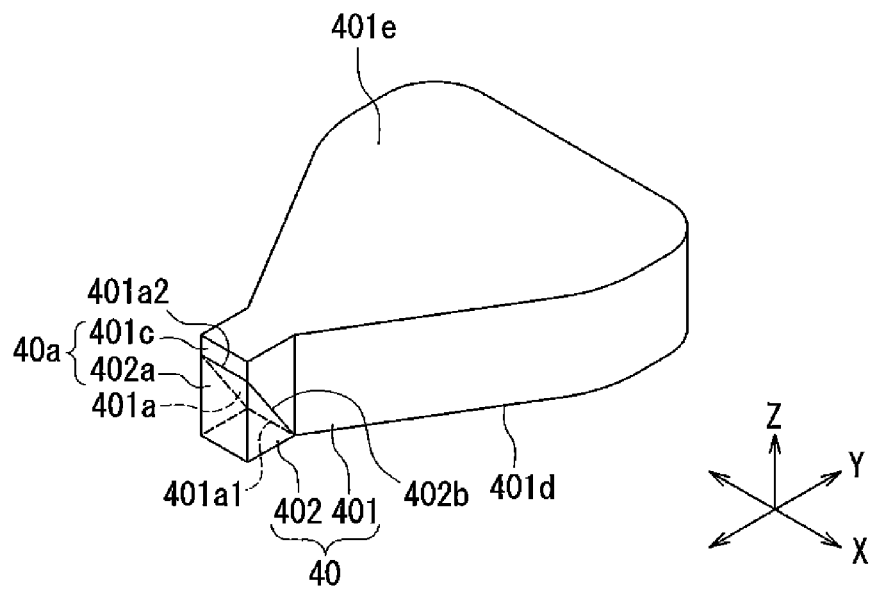
FIG. 29 is a perspective view showing a plasmon generator according to the eighth embodiment of the invention.

A plasmon generator and a thermally-assisted magnetic recording head according to an eighth embodiment of the invention will now be described with reference to FIG. 28 and FIG. 29. FIG. 28 is a cross-sectional view showing the main part of the thermally-assisted magnetic recording head according to the present embodiment. FIG. 29 is a perspective view showing the plasmon generator according to the present embodiment. The configuration of the thermally-assisted magnetic recording head according to the present embodiment, except the plasmon generator 40, is the same as that in the seventh embodiment.

As shown in FIG. 28 and FIG. 29, the plasmon generator 40 according to the present embodiment is upside down from that according to the second embodiment (see FIG. 14 and FIG. 15). In the plasmon generator 40, the first portion 401 has an end face 401c located in the front end face 40a. The end face 401c is located on the front side in the direction of travel of the recording medium 80 (the Z direction), that is, on the trailing side, relative to the first end face 402a of the second portion 402. The lower end of the end face 401c coincides with the second edge 401a2 of the inclined surface 401a. The upper end of the end face 401c is located at an end of the plasmon exciting part 401e. The end face 401c is smaller in area than the first end face 402a of the second portion 402.

The plasmon generator 40 according to the present embodiment can be formed in the same manner as the seventh embodiment, except that the thickness of the first portion 401 is made greater than in the seventh embodiment by D1Z shown in FIG. 15.

The remainder of configuration, function and effects of the present embodiment are similar to those of the seventh embodiment.

Ninth Embodiment

Figure 30:
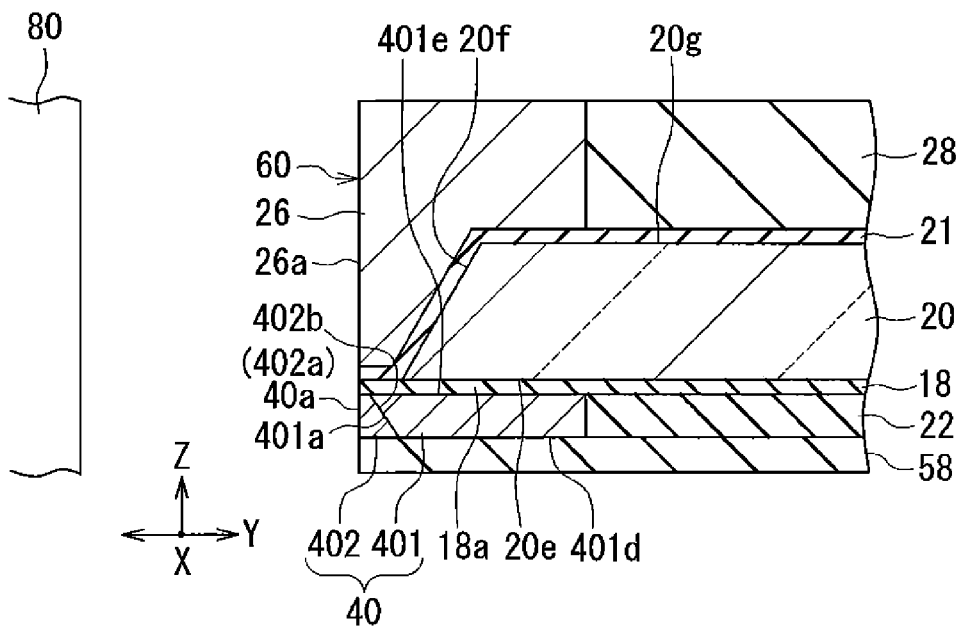
FIG. 30 is a cross-sectional view showing the main part of a thermally-assisted magnetic recording head according to a ninth embodiment of the invention.
Figure 31:
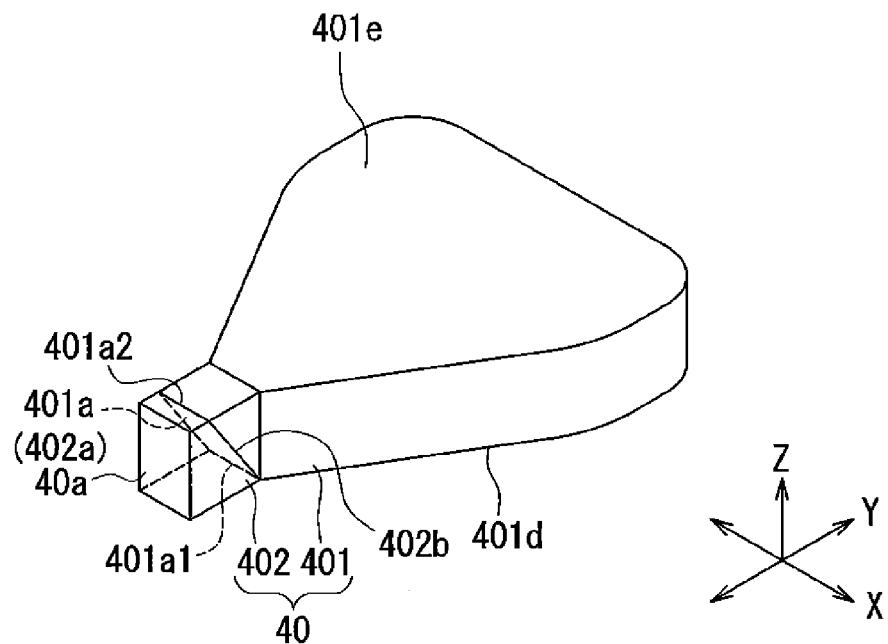
FIG. 31 is a perspective view showing a plasmon generator according to the ninth embodiment of the invention.

A plasmon generator and a thermally-assisted magnetic recording head according to a ninth embodiment of the invention will now be described with reference to FIG. 30 and FIG. 31. FIG. 30 is a cross-sectional view showing the main part of the thermally-assisted magnetic recording head according to the present embodiment. FIG. 31 is a perspective view showing the plasmon generator according to the present embodiment. The configuration of the thermally-assisted magnetic recording head according to the present embodiment, except the plasmon generator 40, is the same as that in the seventh embodiment.

As shown in FIG. 30 and FIG. 31, the plasmon generator 40 according to the present embodiment is upside down from that according to the third embodiment (see FIG. 16 and FIG. 17). In the plasmon generator 40 according to the present embodiment, the second edge 401a2 of the inclined surface 401a is located at a distance from the front end face 40a, and no part of the first portion 401 constitutes part of the front end face 40a. The second portion 402 is trapezoidal in cross section perpendicular to the X direction. The second portion 402 of the present embodiment has the same shape and dimensions as the second portion 402 of the third embodiment, except for being upside down therefrom.

The plasmon generator 40 according to the present embodiment can be formed in the same manner as the seventh embodiment, except that the positions of the inclined surface 401a and the second end face 402b of the second portion 402 are shifted to be farther from the front end face 40a than in the seventh embodiment by D2Y2 shown in FIG. 17.

The remainder of configuration, function and effects of the present embodiment are similar to those of the seventh embodiment.

Tenth Embodiment

Figure 32:
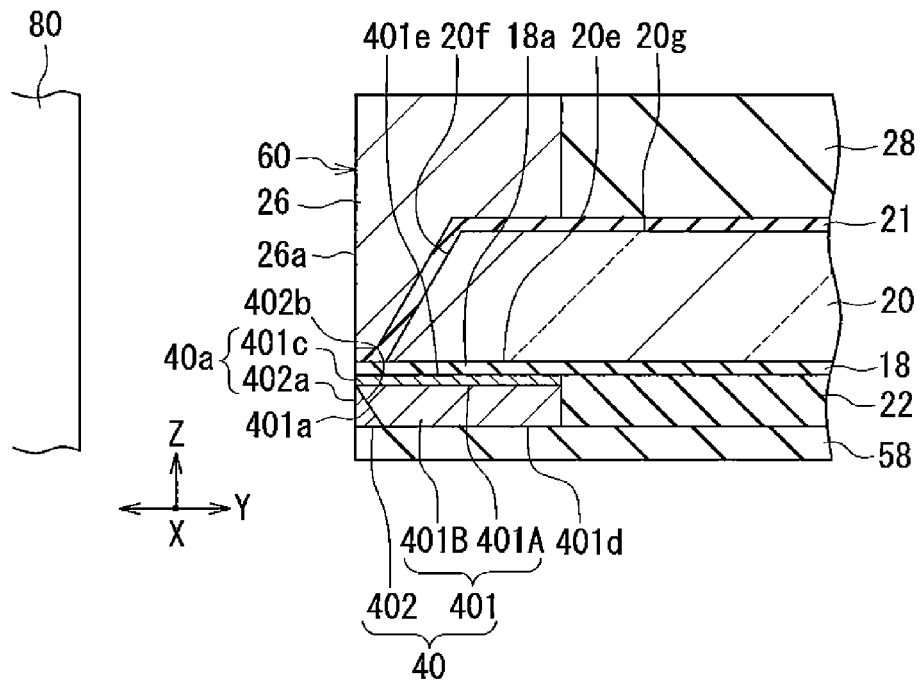
FIG. 32 is a cross-sectional view showing the main part of a thermally-assisted magnetic recording head according to a tenth embodiment of the invention.
Figure 33:
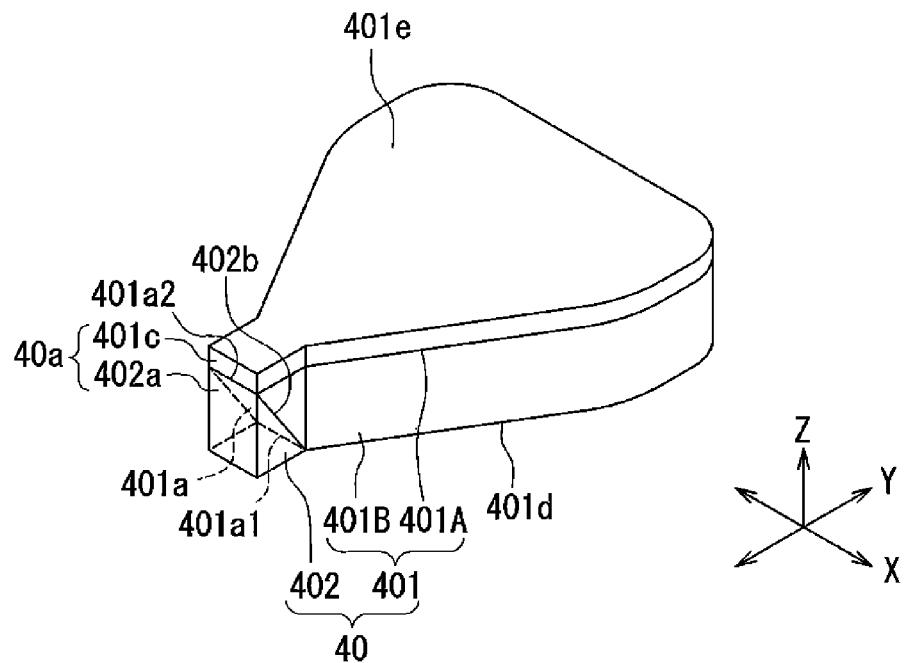
FIG. 33 is a perspective view showing a plasmon generator according to the tenth embodiment of the invention.

A plasmon generator and a thermally-assisted magnetic recording head according to a tenth embodiment of the invention will now be described with reference to FIG. 32 and FIG. 33. FIG. 32 is a cross-sectional view showing the main part of the thermally-assisted magnetic recording head according to the present embodiment. FIG. 33 is a perspective view showing the plasmon generator according to the present embodiment. The configuration of the thermally-assisted magnetic recording head according to the present embodiment, except the plasmon generator 40, is the same as that in the seventh embodiment.

As shown in FIG. 32 and FIG. 33, the plasmon generator 40 according to the present embodiment is upside down from that according to the fourth embodiment (see FIG. 18 and FIG. 19). In the plasmon generator 40, the first portion 401 includes a first layer 401A and a second layer 401B stacked. In the present embodiment, the first layer 401A lies on the second layer 401B. The second layer 401B lies on the dielectric layer 58. The plasmon exciting part 401e is formed by the top surface of the first layer 401A. The first surface (the bottom surface) 401d of the first portion 401 is formed by the bottom surface of the second layer 401B. The overall shape of the first portion 401 is the same as that in the eighth embodiment (see FIG. 28 and FIG. 29).

The first layer 401A has an end face 401c located in the front end face 40a. The second layer 401B has the inclined surface 401a. The lower end of the end face 401c coincides with the second edge 401a2 of the inclined surface 401a. The upper end of the end face 401c is located at an end of the plasmon exciting part 401e. The end face 401c is smaller in area than the first end face 402a of the second portion 402.

Each of the first layer 401A and the second layer 401B is formed of the first metal material which is lower in Vickers hardness than the second metal material. The material of the first layer 401A and that of the second layer 401B may be the same or different.

The plasmon generator 40 according to the present embodiment can be formed in the following manner, for example. First, as in the seventh embodiment, a second metal film that later becomes the second portion 402 is formed and then provided with the second end face 402b. Next, a second film that later becomes the second layer 402B is formed on the second metal film and the dielectric layer 58. The second film is then polished by, for example, CMP, until the second metal film is exposed. Next, a first film that later becomes the first layer 401A is formed on the second metal film and the second film. Then, an etching mask, not illustrated, is formed on the first film. Using this etching mask, portions of the first and second films and a portion of the second metal film are then etched by RIE, for example. The remainder of the first film and the remainder of the second film thereby become the first layer 401A and the second layer 401B, respectively, whereby the first portion 401 is completed. Further, in the step of forming the medium facing surface 60, the first end face 402a is formed and the second metal film thereby becomes the second portion 402. The plasmon generator 40 is thus completed.

The remainder of configuration, function and effects of the present embodiment are similar to those of the seventh or eighth embodiment.

Eleventh Embodiment

Figure 34:
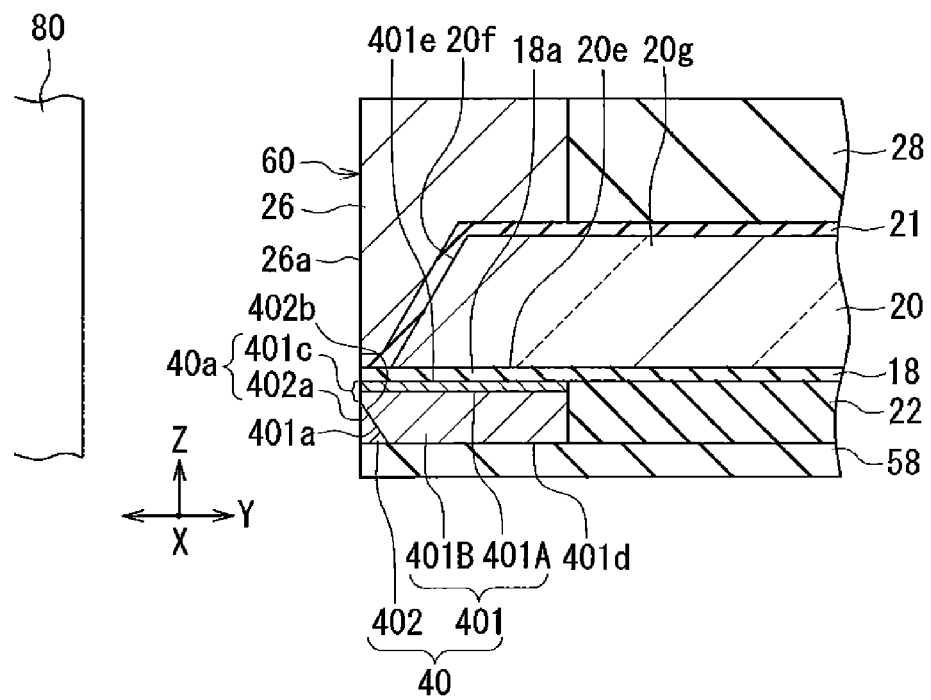
FIG. 34 is a cross-sectional view showing the main part of a thermally-assisted magnetic recording head according to an eleventh embodiment of the invention.
Figure 35:
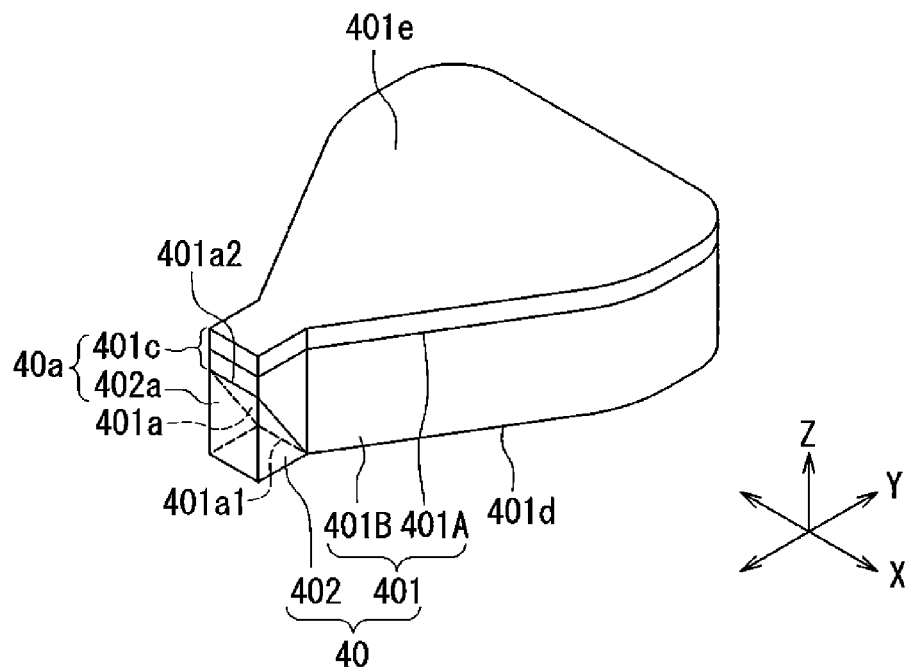
FIG. 35 is a perspective view showing a plasmon generator according to the eleventh embodiment of the invention.

A plasmon generator and a thermally-assisted magnetic recording head according to an eleventh embodiment of the invention will now be described with reference to FIG. 34 and FIG. 35. FIG. 34 is a cross-sectional view showing the main part of the thermally-assisted magnetic recording head according to the present embodiment. FIG. 35 is a perspective view showing the plasmon generator according to the present embodiment. The configuration of the thermally-assisted magnetic recording head according to the present embodiment, except the plasmon generator 40, is the same as that in the seventh embodiment.

As shown in FIG. 34 and FIG. 35, the plasmon generator 40 according to the present embodiment is upside down from that according to the fifth embodiment (see FIG. 20 and FIG. 21). In the plasmon generator 40, the first portion 401 has an end face 401c located in the front end face 40a, as in the eighth embodiment. The lower end of the end face 401c coincides with the second edge 401a2 of the inclined surface 401a. The upper end of the end face 401c is located at an end of the plasmon exciting part 401e. The end face 401c is smaller in area than the first end face 402a of the second portion 402.

Further, in the present embodiment, the first portion 401 includes a first layer 401A and a second layer 401B stacked, as in the tenth embodiment. The first layer 401A has an end face located in the front end face 40a. The second layer 401B has the inclined surface 401a, and an end face located in the front end face 40a. The end face 401c of the first portion 401 is composed of the end face of the first layer 401A and the end face of the second layer 401B.

The plasmon generator 40 according to the present embodiment can be formed in the same manner as the tenth embodiment, except that the second film that later becomes the second layer 401B is made thicker than in the tenth embodiment.

The remainder of configuration, function and effects of the present embodiment are similar to those of the tenth embodiment.

Twelfth Embodiment

Figure 36:
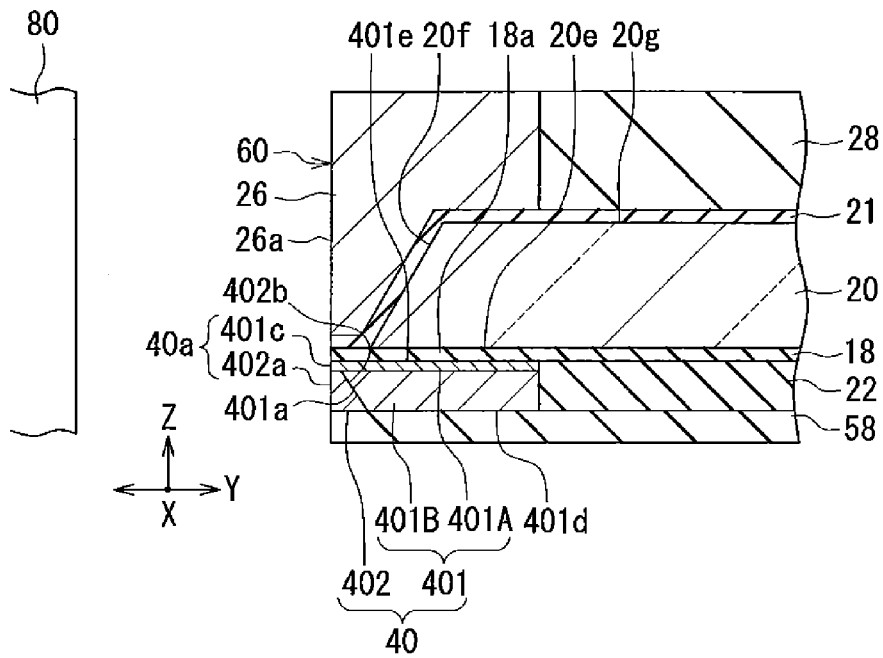
FIG. 36 is a cross-sectional view showing the main part of a thermally-assisted magnetic recording head according to a twelfth embodiment of the invention.
Figure 37:
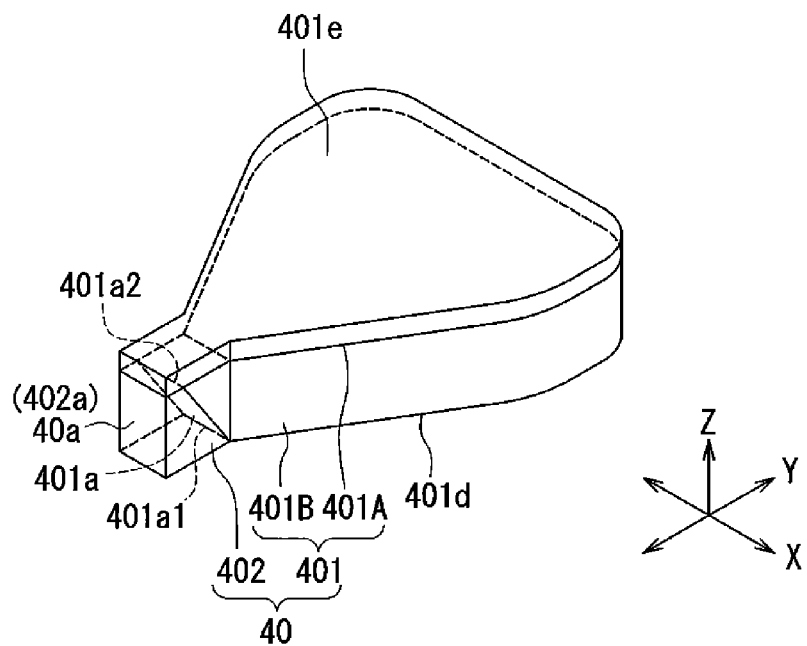
FIG. 37 is a perspective view showing a plasmon generator according to the twelfth embodiment of the invention.

A plasmon generator and a thermally-assisted magnetic recording head according to a twelfth embodiment of the invention will now be described with reference to FIG. 36 and FIG. 37. FIG. 36 is a cross-sectional view showing the main part of the thermally-assisted magnetic recording head according to the present embodiment. FIG. 37 is a perspective view showing the plasmon generator according to the present embodiment. The configuration of the thermally-assisted magnetic recording head according to the present embodiment, except the plasmon generator 40, is the same as that in the seventh embodiment.

As shown in FIG. 36 and FIG. 37, the plasmon generator 40 according to the present embodiment is upside down from that according to the sixth embodiment (see FIG. 22 and FIG. 23). In the plasmon generator 40, the second edge 401a2 of the inclined surface 401a is located at a distance from the front end face 40a, as in the ninth embodiment. The second portion 402 is trapezoidal in cross section perpendicular to the X direction.

Further, in the present embodiment, the first portion 401 includes a first layer 401A and a second layer 401B stacked, as in the tenth embodiment. The first layer 401A has an end face 401c located in the front end face 40a. The second layer 401B has the inclined surface 401a.

The plasmon generator 40 according to the present embodiment can be formed in the same manner as the tenth embodiment, except that the positions of the inclined surface 401a and the second end face 402b of the second portion 402 are shifted to be farther from the front end face 40a than in the tenth embodiment by D2Y2 shown in FIG. 17.

In the present embodiment, the first portion 401 having the shape shown in FIG. 36 and FIG. 37 may be formed of a single layer. The remainder of configuration, function and effects of the present embodiment are similar to those of the ninth or tenth embodiment.

The present invention is not limited to the foregoing embodiments, and various modifications may be made thereto. For example, as far as the requirements of the appended claims are met, the shape of the plasmon generator and the locations of the plasmon generator, the core, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A plasmon generator having a front end face and comprising:
    a first portion formed of a first metal material; and
    a second portion formed of a second metal material, wherein
    the first portion has an inclined surface facing toward the front end face,
    the inclined surface has a first edge farthest from the front end face and a second edge closest to the front end face,
    a distance from the front end face to an arbitrary point on the inclined surface decreases with decreasing distance from the arbitrary point to the second edge,
    the second portion is located between the inclined surface and the front end face, and includes a first end face located in the front end face and a second end face in contact with the inclined surface,
    the second metal material is higher in Vickers hardness than the first metal material,
    the first portion has a plasmon exciting part configured to excite a surface plasmon thereon through coupling with evanescent light generated from a core through which light propagates, and
    the front end face generates near-field light based on the surface plasmon.

2. The plasmon generator according to claim 1, wherein
    the first portion further has a first surface connected to the inclined surface at the first edge and extending in a direction intersecting the front end face, and a second surface opposite to the first surface, and
    the second surface constitutes the plasmon exciting part.

3. The plasmon generator according to claim 1, wherein no part of the first portion other than the second edge of the inclined surface is located in the front end face.

4. The plasmon generator according to claim 1, wherein
    the first portion further has an end face located in the front end face, and
    the end face of the first portion is smaller in area than the first end face of the second portion.

5. The plasmon generator according to claim 1, wherein no part of the first portion constitutes part of the front end face.

6. The plasmon generator according to claim 1, wherein
    the first portion includes a first layer and a second layer stacked,
    the first layer has an end face located in the front end face,
    the second layer has the inclined surface, and
    the end face of the first layer is smaller in area than the first end face of the second portion.

7. A thermally-assisted magnetic recording head comprising:
    a medium facing surface facing a recording medium;
    a main pole that produces a write magnetic field for writing data on the recording medium;
    a waveguide including a core through which light propagates, and a cladding provided around the core; and
    a plasmon generator having a front end face located in the medium facing surface, the plasmon generator including:
    a first portion formed of a first metal material; and
    a second portion formed of a second metal material, wherein
    the first portion has an inclined surface facing toward the front end face,
    the inclined surface has a first edge farthest from the front end face and a second edge closest to the front end face,
    a distance from the front end face to an arbitrary point on the inclined surface decreases with decreasing distance from the arbitrary point to the second edge,
    the second portion is located between the inclined surface and the front end face, and includes a first end face located in the front end face and a second end face in contact with the inclined surface,
    the second metal material is higher in Vickers hardness than the first metal material, the first portion has a plasmon exciting part configured to excite a surface plasmon thereon through coupling with evanescent light generated from the core, and the front end face generates near-field light based on the surface plasmon.

8. The thermally-assisted magnetic recording head according to claim 7, wherein the first portion further has a first surface connected to the inclined surface at the first edge and extending in a direction intersecting the front end face, and a second surface opposite to the first surface, and the second surface constitutes the plasmon exciting part.

9. The thermally-assisted magnetic recording head according to claim 7, wherein no part of the first portion other than the second edge of the inclined surface is located in the front end face.

10. The thermally-assisted magnetic recording head according to claim 7, wherein the first portion further has an end face located in the front end face, and the end face of the first portion is smaller in area than the first end face of the second portion.

11. The thermally-assisted magnetic recording head according to claim 7, wherein no part of the first portion constitutes part of the front end face.

12. The thermally-assisted magnetic recording head according to claim 7, wherein the first portion includes a first layer and a second layer stacked, the first layer has an end face located in the front end face, the second layer has the inclined surface, and the end face of the first layer is smaller in area than the first end face of the second portion.

13. The thermally-assisted magnetic recording head according to claim 7, wherein the core has an evanescent light generating surface that generates the evanescent light based on the light propagating through the core, and the cladding includes an interposition part interposed between the evanescent light generating surface and the plasmon exciting part.

* * * * *